United States Patent
Jie

(10) Patent No.: US 11,830,211 B2
(45) Date of Patent: Nov. 28, 2023

(54) DISPARITY MAP ACQUISITION METHOD AND APPARATUS, DEVICE, CONTROL SYSTEM AND STORAGE MEDIUM

(71) Applicant: TENCENT TECHNOLOGY (SHENZHEN) COMPANY LIMITED, Guangdong (CN)

(72) Inventor: Ze Qun Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 322 days.

(21) Appl. No.: 17/237,183

(22) Filed: Apr. 22, 2021

(65) Prior Publication Data

US 2021/0241479 A1    Aug. 5, 2021

Related U.S. Application Data

(63) Continuation of application No. PCT/CN2020/078564, filed on Mar. 10, 2020.

(30) Foreign Application Priority Data

Mar. 12, 2019    (CN) .......................... 201910186202.2

(51) Int. Cl.
*G06K 9/00* (2022.01)
*G06T 7/593* (2017.01)
(Continued)

(52) U.S. Cl.
CPC ............ *G06T 7/593* (2017.01); *G06F 18/213* (2023.01); *G06V 10/764* (2022.01); *G06V 10/82* (2022.01); *G06V 20/58* (2022.01)

(58) Field of Classification Search
CPC ........... G06T 7/593; G06T 2207/20084; G06T 2207/30252; G06F 18/213; G06V 10/764; G06V 10/82; G06V 20/58; G06N 3/04
See application file for complete search history.

(56) References Cited

U.S. PATENT DOCUMENTS 8,447,098 B1 * 5/2013 Cohen ..................... G06F 18/00
                                                                    382/154
10,764,561 B1 * 9/2020 Devitt .................. H04N 13/106
(Continued)

FOREIGN PATENT DOCUMENTS

CN        106355570 A    1/2017
CN        108537837 A    9/2018
(Continued)

OTHER PUBLICATIONS

Extended European Search Report dated Apr. 4, 2022 in European Application No. 20770825.6.
(Continued)

*Primary Examiner* — Dhaval V Patel
(74) *Attorney, Agent, or Firm* — Sughrue Mion, PLLC

(57) ABSTRACT

Embodiments of the disclosure provide a disparity map acquisition method and apparatus, a device, a control system and a storage medium. The method includes: respectively performing feature extraction on left-view images and right-view images of a captured object layer by layer through M cascaded feature extraction layers, to obtain a left-view feature map set and a right-view feature map set of each layer, M being a positive integer greater than or equal to 2; constructing an initial disparity map based on the left-view feature map set and the right-view feature map set extracted by an $M^{th}$ feature extraction layer; and iteratively refining, starting from an $(M-1)^{th}$ layer, the disparity map through the left-view feature map set and the right-view feature map set extracted by each feature extraction layer in sequence until a final disparity map is obtained based on an iteratively refined disparity map of a first layer.

18 Claims, 9 Drawing Sheets

(51) Int. Cl.
*G06F 18/213* (2023.01)
*G06V 10/764* (2022.01)
*G06V 10/82* (2022.01)
*G06V 20/58* (2022.01)

(56) References Cited

U.S. PATENT DOCUMENTS

| | | | | |
|---|---|---|---|---|
| 2014/0240310 | A1* | 8/2014 | Guseva | G06T 7/593 345/419 |
| 2015/0117757 | A1* | 4/2015 | Drazic | H04N 13/128 382/154 |
| 2016/0150210 | A1 | 5/2016 | Chang et al. | |
| 2016/0198138 | A1* | 7/2016 | Wu | G06T 7/593 348/47 |
| 2019/0213481 | A1* | 7/2019 | Godard | G06V 10/764 |

FOREIGN PATENT DOCUMENTS

| | | |
|---|---|---|
| CN | 108681753 A | 10/2018 |
| CN | 108986136 A | 12/2018 |
| CN | 109919993 A | 6/2019 |
| EP | 3070671 A1 | 9/2016 |

OTHER PUBLICATIONS

Zhengfa Liang et al., "Learning for Disparity Estimation through Feature Constancy", IEEE/CVF Conference on Computer Vision and Pattern Recognition, IEEE, 2018, pp. 2811-2820 (10 pages total).

Haiwei Sang et al., "Multi-Scale Context Attention Network for Stereo Matching", IEEE Access, 2019, vol. 7, pp. 15152-15161 (10 pages total).

Zequn Jie et al., "Left-Right Comparative Recurrent Model for Stereo Matching", IEEE/CVF Conference on Computer Vision and Pattern Recognition, IEEE, 2018, pp. 3838-3846 (9 pages total).

International Search Report for PCT/CN2020/078564 dated Jun. 5, 2020 [PCT/ISA/210].

Written Opinion for PCT/CN2020/078564 dated Jun. 5, 2020 [PCT/ISA/237].

* cited by examiner

DISPARITY MAP ACQUISITION METHOD AND APPARATUS, DEVICE, CONTROL SYSTEM AND STORAGE MEDIUM

CROSS-REFERENCE TO RELATED APPLICATION(S)

This application is a bypass continuation application of International Application No. PCT/CN2020/078564, filed Mar. 10, 2020, which claims priority to Chinese Patent Application No. 201910186202.2 filed with the China National Intellectual Property Administration on Mar. 12, 2019 and entitled "DISPARITY MAP ACQUISITION METHOD AND APPARATUS, DEVICE AND CONTROL SYSTEM", the disclosures of which are herein incorporated by reference in their entireties.

FIELD

The disclosure relates to the technical field of image processing, and in particular, to a disparity map acquisition method and apparatus, a device, a control system and a storage medium.

BACKGROUND

Binocular stereo vision is a branch of Artificial Intelligence (AI). It is a method for acquiring three-dimensional geometric information of objects from multiple images based on the principle of disparity to simulate the visual perception of human eyes, and is an important form of machine vision. A binocular stereo vision system generally uses a binocular camera to obtain two images of a measured object simultaneously from different angles, or uses a monocular camera to capture two images, i.e., a left-view image and a right-view image, of the measured object from different angles, and recovers the three-dimensional geometric information of the object based on the principle of disparity to reconstruct a three-dimensional contour and position of the object. The binocular stereo vision technology has broad application prospects in the field of machine vision. Generally, disparity prediction is carried out based on images, so the result of the disparity prediction is generally a disparity map, and each pixel point in the disparity map represents the disparity between pixel points at a corresponding position in the original image. In practical scenarios, the disparity value is negatively correlated with the depth. In other words, the larger the disparity value is, the closer the object in the captured image is to the camera; the smaller the disparity value is, the farther the object in the captured image is away from the camera. Therefore, the three-dimensional geometric information of the object can be recovered according to the distance, and the depth can be calculated through the disparity value.

SUMMARY

Embodiments of the disclosure provide a disparity map acquisition method and apparatus, a device, a control system and a storage medium, to improve the accuracy of disparity prediction.

According to an aspect of an example embodiment, provided is a disparity map acquisition method, executed by a computer device, the method including:

respectively performing, for each layer of M cascaded feature extraction layers, feature extraction on left-view images and right-view images of a captured object, to obtain a left-view feature map set and a right-view feature map set of each feature extraction layer, M being a positive integer greater than or equal to 2;

obtaining an initial disparity map based on the left-view feature map set and the right-view feature map set extracted by an $M^{th}$ feature extraction layer; and iteratively refining, in an order from an $(M-1)^{th}$ feature extraction layer to a first feature extraction layer in sequence, a disparity map through the left-view feature map set and the right-view feature map set extracted by each feature extraction layer until a final disparity map is obtained based on an iteratively refined disparity map of the first feature extraction layer, an iteratively refined disparity map of an $i^{th}$ feature extraction layer being obtained by refining, by using a residual of a matching cost for matching the left-view feature map set and the right-view feature map set extracted by the $i^{th}$ feature extraction layer, a matching cost after iterative refinement of an $(i+1)^{th}$ feature extraction layer, the disparity map used by the $(M-1)^{th}$ feature extraction layer for iterative refining being the initial disparity map, and i being a positive integer greater than zero and less than M.

According to an aspect of an example embodiment, provided is a disparity map acquisition apparatus, including:

at least one memory configured to store program code; and at least one processor configured to read the program code and operate as instructed by the program code, the program code including:

feature extraction code configured to cause at least one of the at least one processor to respectively perform, for each layer of M cascaded feature extraction layers, feature extraction on left-view images and right-view images of a captured object, to obtain a left-view feature map set and a right-view feature map set of each feature extraction layer, M being a positive integer greater than or equal to 2;

initial disparity map obtainment code configured to cause at least one of the at least one processor to obtain an initial disparity map based on the left-view feature map set and the right-view feature map set extracted by an $M^{th}$ feature extraction layer; and disparity map refinement code configured to cause at least one of the at least one processor to, iteratively refine, in an order from the $(M-1)^{th}$ feature extraction layer to a first feature extraction layer in sequence, a disparity map through the left-view feature map set and the right-view feature map set extracted by each feature extraction layer until a final disparity map is obtained based on an iteratively refined disparity map of the first feature extraction layer, an iteratively refined disparity map of an $i^{th}$ feature extraction layer being obtained by refining, by using a residual of a matching cost for matching the left-view feature map set and the right-view feature map set extracted by the $i^{th}$ feature extraction layer, a matching cost after iterative refinement of an $(i+1)^{th}$ feature extraction layer, the disparity map used by the $(M-1)^{th}$ feature extraction layer for iterative refining being the initial disparity map, and i being a positive integer greater than zero and less than M.

According to an aspect of an example embodiment, provided is a computer device, including a memory, a processor, and a computer program stored on the memory and executable by the processor, the processor being configured to execute the computer program to implement operations of the method in the foregoing aspect.

According to an aspect of an example embodiment, provided is a control system, including a binocular camera and a computer device;

the binocular camera including a left-view camera lens and a right-view camera lens, the left-view camera lens being configured to capture a left-view image, and the right-view camera lens being configured to capture a right-view image; and the computer device being configured to use the method in the foregoing aspect to acquire a disparity map between the left-view image and the right-view image, predict a distance from a photographed object in the left-view image and the right-view image to the binocular camera according to the disparity map, and implement control over a controlled system according to the predicted distance.

According to an aspect of an example embodiment, provided is a non-transitory computer readable storage medium, the computer readable storage medium having computer instructions stored thereon, the computer instructions, when run on at least one processor, causing at least one of the at least one processor to perform the foregoing method.

BRIEF DESCRIPTION OF THE DRAWINGS

To describe the technical solutions in the embodiments of the disclosure more clearly, the following briefly describes the accompanying drawings required for describing the embodiments. The accompanying drawings in the following descriptions show merely embodiments of the disclosure, and a person of ordinary skill in the art may still derive other drawings from these accompanying drawings without creative efforts.

DETAILED DESCRIPTION

To make the objectives, technical solutions, and advantages of the disclosure clearer, the following clearly and completely describes the technical solutions in the embodiments of the disclosure with reference to the accompanying drawings in the embodiments of the disclosure. The described embodiments are merely some rather than all of the embodiments of the disclosure. All other embodiments obtained by a person of ordinary skill in the art based on the embodiments of the disclosure without creative efforts shall fall within the protection scope of the disclosure. The embodiments in the disclosure and features in the embodiments may be combined with each other in the case of no conflict. In addition, although a logic order is shown in the flowcharts, in some cases, the shown or described operations may be performed in an order different from the order herein.

To help understand the technical solutions provided in the embodiments of the disclosure, some key items used in the embodiments of the disclosure are explained herein first.

Binocular camera: also called a binocular vision measurement probe, which generally includes two camera lenses with a known distance, and two binocular images may be respectively captured through the two camera lenses. A camera lens located on the left side is a left-view camera lens, and accordingly, the image captured by the left-view camera lens is a left-view image. A camera lens located on the right side is a right-view camera lens, and accordingly, the image captured by the right-view camera lens is a right-view image.

Figure 1:
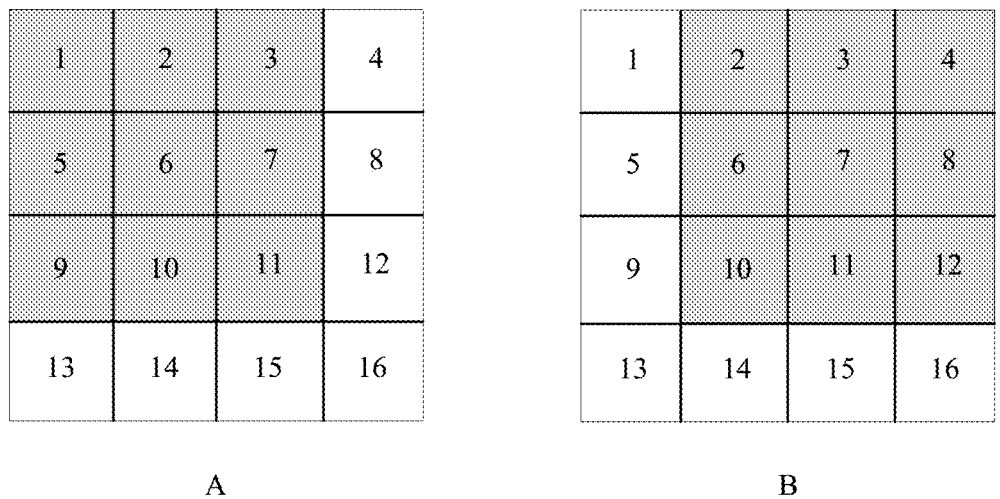
FIG. 1 is a schematic diagram of disparities of image A and image B according to an embodiment of the disclosure.

Disparity: a horizontal distance between center pixels of two matching blocks in left and right binocular images. As shown in FIG. 1, image A and image B are respectively a left-view image and a right-view image. The size of matching blocks is 3×3. The matching blocks in image A and image B are respectively shown in gray areas in FIG. 1. The center pixels of the two matching blocks are respectively pixel point 6 and pixel point 7, and a disparity between the two matching blocks is one pixel. Certainly, in practical applications, the size of the matching blocks may be set according to the actual situation, for example, may be set to 1×1, and the disparity is a horizontal distance between two matched pixel points.

Figure 2:
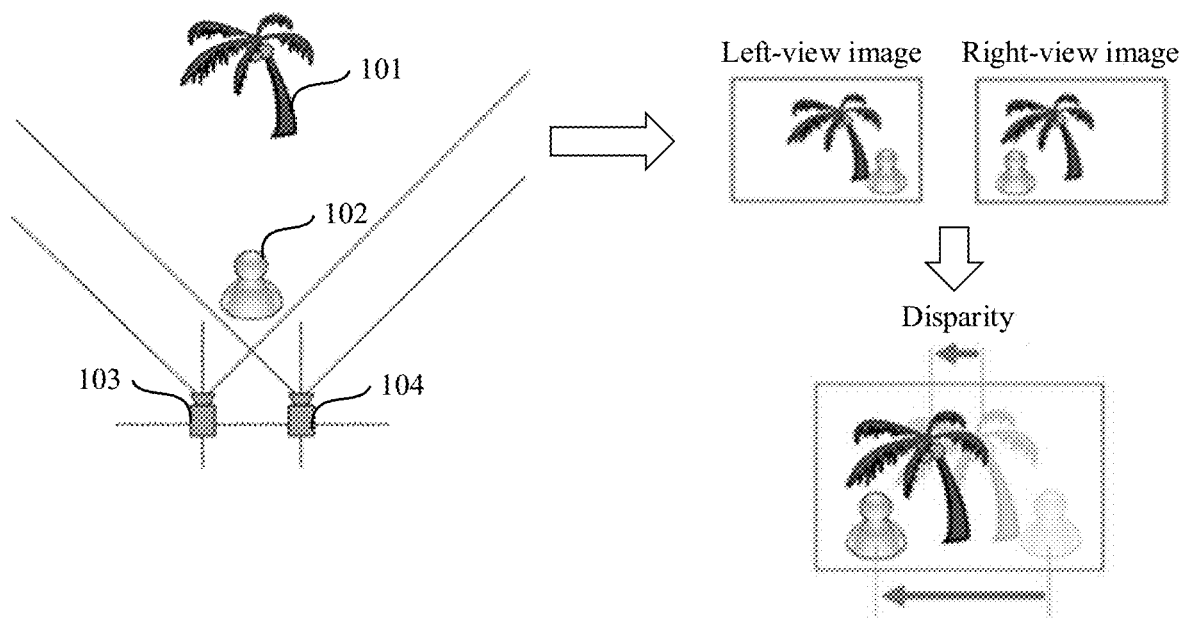
FIG. 2 is a schematic diagram of a disparity between images captured by a binocular camera according to an embodiment of the disclosure.

For another example, as shown in FIG. 2, in the same scenario, a left-view image and a right-view image are respectively obtained by capturing (or photographing) an object 101 and an object 102 in this scenario through a camera lens 103 and a camera lens 104 at different angles. There is a significant difference between the left-view image and the right-view image. That is, the object 101 is located at the left side of the object 102 in the left-view image, while the object 101 is located at the right side of the object 102 in the right-view image. The distance between the objects after the left-view image and the right-view image are overlapped is the disparity between the left-view image and the right-view image at the position of the object.

Disparity map: an image formed by representing matching blocks with disparities of the matching blocks. In the disparity map, if the disparities are the same, it indicates that distances from the objects to the camera lenses are the same, and the greater the disparities are, the closer the objects are to the camera lenses. Generally, to express the disparity map more intuitively, the same disparity value may be expressed by the same color, and when the disparity value changes according to a specific rule, the color may also change accordingly. For example, when the disparity value is smaller, the darker color is used for expression, and the disparity value is larger, the lighter color is used for expression.

Convolutional neural networks (CNN): a type of feed forward neural networks including convolution calculation and having a depth structure. The CNNs may learn grid-like topology features, such as pixels, with a small calculation amount. The effect is stable and there are no additional feature engineering requirements for data. Generally, the CNN may be a network structure such as a Residual Neural Network (ResNet) and GoogleNet.

Convolutional layer: for a device, an image is essentially stored in the form of a pixel matrix. Therefore, the processing of the image is also essentially performed based on the pixel matrix. In the convolutional layer, convolution operation is performed on the pixel matrix according to a preset step length and a convolution kernel of a preset size. Generally, the preset step length may be set to 1. In other words, after the calculation of a convolution kernel is completed, the next convolution kernel is the previous convolution kernel shifted by one pixel to the right. Certainly, the preset step length may also be set to other values, for example, the preset step length may be set to 2 or 3, which is not limited in the embodiment of the disclosure.

Convolution kernel: a local area in a pixel matrix. For an image, pixels in the local area are closely related in space. For example, pixels close to each other generally have the same color texture. As a result, the correlation between the pixels close to each other is stronger, while the correlation between pixels distant from each other is weaker. Therefore, by perceiving local areas of the image and combining the information of these local areas, global information of the entire image may be obtained.

Convolution operation: a process of multiplying a convolution kernel of a preset size by values of weights of the convolution kernel and then summing, moving to the next convolution kernel according to the preset step length, and multiplying the next convolution kernel by values of weights of this convolution kernel and then summing. The smaller the size of the convolution kernel is, the more careful the image needs to be viewed, and the greater the amount of information acquired from the image is. Correspondingly, the calculation amount of the entire convolution operation is larger. Therefore, the size of the convolution kernel may be measured according to the actual situation, for example, the preset size may be 3×3. Certainly, the size of the convolution kernel may also be any other value.

Feature map: which is extracted through the convolutional layer of the above-mentioned CNN, and is essentially a pixel matrix. Each element in the pixel matrix may be considered as a pixel point on the feature map, and the value of the position of the pixel point is the feature value of a region or a pixel point in the original image.

Attention mechanism: the attention mechanism is essentially a means to screen high-value information from a large amount of information. The attention mechanism implements the mapping from a query and a series of key-value pairs to an output. In the embodiments of the disclosure, query, key, and value are feature maps or superimposed feature maps.

In addition, the term "and/or" in this specification describes only an association relationship for describing associated objects and represents that three relationships may exist. For example, A and/or B may represent the following three cases: Only A exists, both A and B exist, and only B exists. In addition, if there is no special description, the character "/" in this specification generally indicates an "or" relationship between the associated objects.

Disparity prediction technology needs to be applied to control systems that use the results of disparity prediction, such as robot control systems or autonomous vehicles. Therefore, in practical applications, the accuracy of disparity prediction directly affects the determination of the distance from an object, and thus affects the recovery of three-dimensional geometric information of the object, and further affects the control accuracy of the control system, which may cause safety hazards.

At present, there are mainly two methods for disparity prediction as follows:

The first method is to simply predict the matching similarity between a left-view image and a right-view image in different disparities. In other words, during disparity prediction, only matching information of the left-view image and the right-view image is utilized to predict the disparity of the left-view image. Therefore, the prediction method is relatively simple, and the accuracy of disparity prediction is greatly reduced in areas where binocular matching is difficult, such as repetitive areas, texture missing areas, and edges of complex objects.

The second method is a method of using a recurrent neural network for disparity prediction. However, this method relates to obtaining an initial disparity map by running the entire neural network for the first time, and correcting the initial disparity map by running the entire neural network again. Therefore, according to this method, the neural network needs to be run again in each refinement process, and the running time is proportional to the number of refinements, resulting in a large calculation amount and long time.

In view of the above, the embodiment of the disclosure provides a disparity map acquisition method. In this method, an initial disparity map is constructed through a left-view feature map set and a right-view feature map set extracted by an end feature extraction layer (or a last feature extraction layer, e.g., M-th feature extraction layer), and then the initial disparity map is refined layer by layer through left-view feature map sets and right-view feature map sets extracted by the first (M−1)-th feature extraction layers, to correct the refined disparity map of the previous layer through the feature map set extracted by each layer, thereby gradually reducing the error value of the disparity map and improving the finally obtained accuracy of the final disparity map. Moreover, in the embodiment of the disclosure, during the refinement of the disparity map on each layer, the disparity map outputted by the previous layer is verified through the feature map set extracted by each layer and a residual is obtained, and then a matching cost is corrected through the residual to obtain a refined disparity map. Therefore, compared with the method using a recurrent neural network, the iterative refinement in the embodiments of the disclosure does not significantly increase the calculation amount of disparity map prediction, and the time required to obtain the final disparity map is substantially the same as that without iterative refinement. Therefore, this is more time-saving or time efficient.

In addition, in the embodiments of the disclosure, in the process of iterative refinement, because image features described by different layers are located at different scales, that is, each layer gradually changes from shallow local features to deep global semantic features, in other words, it is equivalent to reverse correction of the disparity map, the disparity map may be gradually recovered from an initial low resolution to approximate to the original image resolution, and the disparity map obtained by the prediction of the previous layer may be utilized to guide the estimation of the disparity map of the next layer, to achieve the purpose of continuously correcting and refining the disparity map.

In the embodiments of the disclosure, an attention mechanism is used during iterative refinement, and its parameter scale is much smaller than that of the recurrent neural network. Therefore, the calculation overhead is greatly reduced, and the time cost is saved.

The following briefly describes application scenarios to which the technical solutions in the embodiments of the disclosure may be applied. The application scenarios described below are merely used for describing rather than limiting the embodiments of the disclosure. In a specific implementation, the technical solutions provided in the embodiments of the disclosure may be flexibly applied according to an actual requirement.

Figure 3:
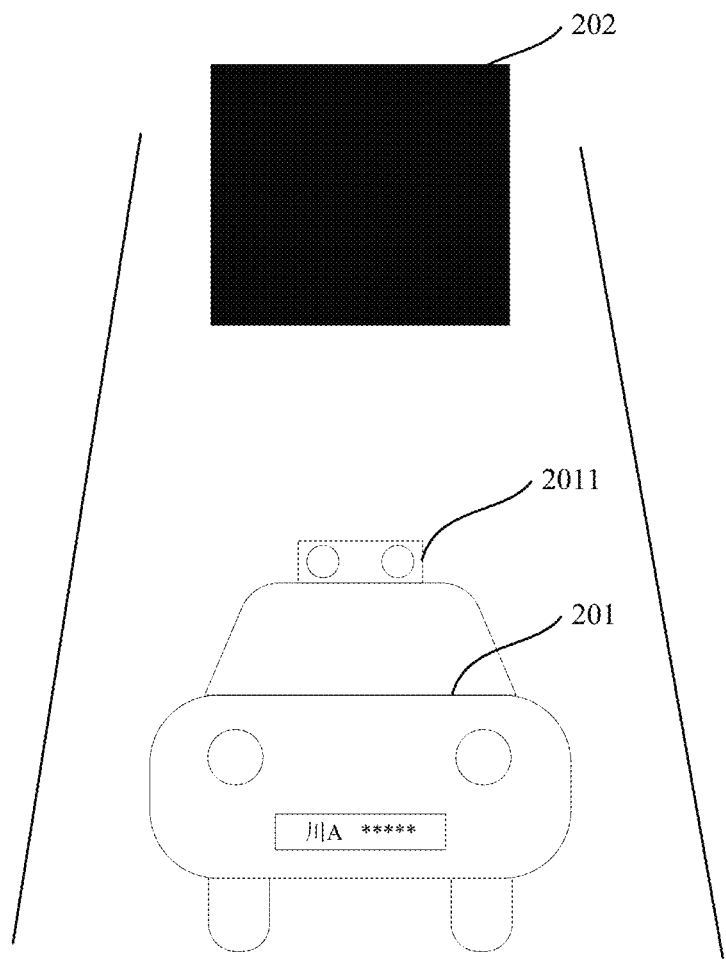
FIG. 3 is a schematic diagram of an application scenario according to an embodiment of the disclosure.

Referring to FIG. 3, an example scenario in which the technical solution in the embodiments of the disclosure is applied to an autonomous vehicle is described. In this scenario, a first vehicle 201 and a second vehicle 202 are selected as an example for description.

The first vehicle 201 may be an autonomous vehicle, and the first vehicle 201 is provided with a binocular camera 2011. The binocular camera 2011 includes a left-view camera lens and a right-view camera lens. The left-view camera lens is configured to capture a left-view image, and the right-view camera lens is configured to capture a right-view image.

The second vehicle 202 may be a vehicle traveling ahead of the first vehicle 201. The second vehicle 202 may be an autonomous vehicle, and may be a normal manually driven vehicle.

In practical applications, a left-view image and a right-view image may be captured in real time through the left-view camera lens and the right-view camera lens included in the binocular camera 2011. For example, capturing areas (e.g., photography areas) of the camera lenses are areas in front of the vehicle. In the scenario as shown in FIG. 3, the left-view image and the right-view image captured by the first vehicle 201 may include the second vehicle 202, and disparity prediction may be performed on the left-view image and the right-view image by using the disparity map acquisition method provided in the embodiments of the disclosure to acquire a disparity map between the left-view image and the right-view image, thereby predicting a distance from each captured object in the left-view image and the right-view image to the binocular camera 2011, such as a distance between the second vehicle 202 and the binocular camera 2011, through depth prediction based on the disparity map, thus assisting the first vehicle 201 to implement autonomous driving operation. For example, when it is predicted that the distance between the second vehicle 202 and the binocular camera 2011 is relatively short, the first vehicle 201 is controlled to decelerate to avoid an accident.

Certainly, in this scenario, in addition to the first vehicle 201 and the second vehicle 202, all objects that the vehicle may encounter during traveling, such as roadblocks, roadside fences, traffic lights and pedestrians, may further be included, which is not limited in the embodiment of the disclosure.

Through the disparity map acquisition method in the embodiment of the disclosure, the distance of each object in the capturing area of the binocular camera 2011 may be analyzed. In this way, the method provided in the embodiments of the disclosure is used for simulating the visual perception of human eyes, thereby assisting in implementing the automated driving of the vehicle.

Figure 4:
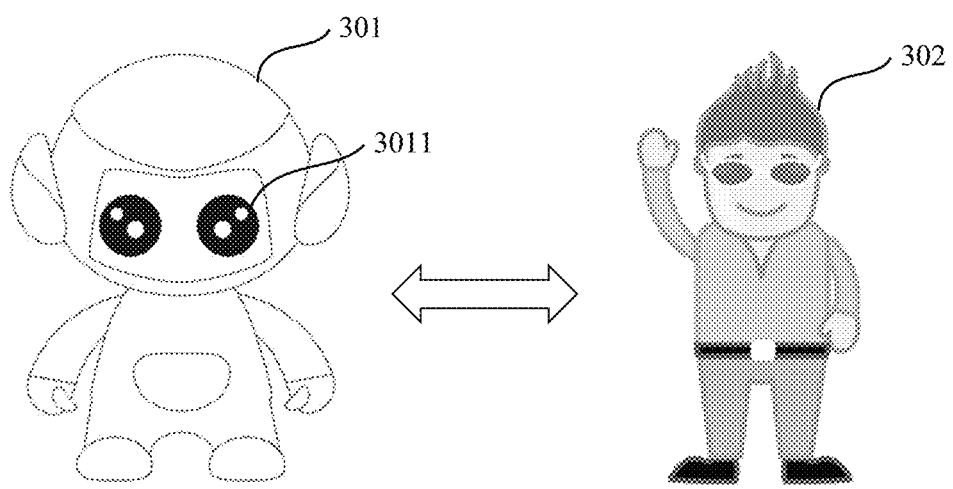
FIG. 4 is a schematic diagram of another application scenario according to an embodiment of the disclosure.

FIG. 4 shows an application scenario of controlling a robot through the technical solution in the embodiment of the disclosure. In the disclosure scenario, a robot 301 and an object 302 may be included.

The robot 301 is provided with a binocular camera 3011. The binocular camera 3011 may include a left-view camera lens and a right-view camera lens. The left-view camera lens is configured to capture a left-view image, and the right-view camera lens is configured to capture a right-view image.

The object 302 may be, for example, goods or a person. In practical applications, the binocular camera 3011 may capture (or photograph) the object 302 in a capturing area in real time. For example, when the object 302 is a person, if the person from a distance is walking toward a the robot 301, the binocular camera 3011 may capture a left-view image and a right-view image including a portrait of the person 302, and disparity prediction may be performed on the left-view image and the right-view image by using the disparity map acquisition method provided in the embodiments of the disclosure to acquire a disparity map between the left-view image and the right-view image, thereby predicting a distance from each captured object in the left-view image and the right-view image to the binocular camera 3011, for example, determining a distance between the person 302 and the binocular camera 3011, through depth prediction based on the disparity map. Accordingly, the focal length of the binocular camera 3011 is adjusted to track a line of sight of the person in the image, thereby simulating changes in the line of sight of a real person when someone is coming in the opposite direction.

Alternatively, when the person 302 in front of the robot wants to high-five the robot, and the person 302 raises his/her palm, the binocular camera 3011 may capture a left-view image and a right-view image including the palm, and disparity prediction may be performed on the left-view image and the right-view image by using the disparity map acquisition method provided in the embodiments of the disclosure through a processor included in the robot 301, thereby determining a distance between the palm and the binocular camera 3011. Accordingly, a mechanical arm of the robot is controlled to move to a corresponding distance position, to complete the high-five action with the person 302.

Through the disparity map acquisition method in the embodiment of the disclosure, the distance of each object in the capturing area of the binocular camera 3011 may be analyzed, so that the robot may have a visual perception function similar to human eyes, making the robot more intelligent, and assisting the robot to complete the corresponding work.

Certainly, the method provided in the embodiment of the disclosure is not limited to the application scenarios shown in FIG. 3 and FIG. 4, and may also be used in other possible control systems, which is not limited in the embodiments of the disclosure.

Figure 5:
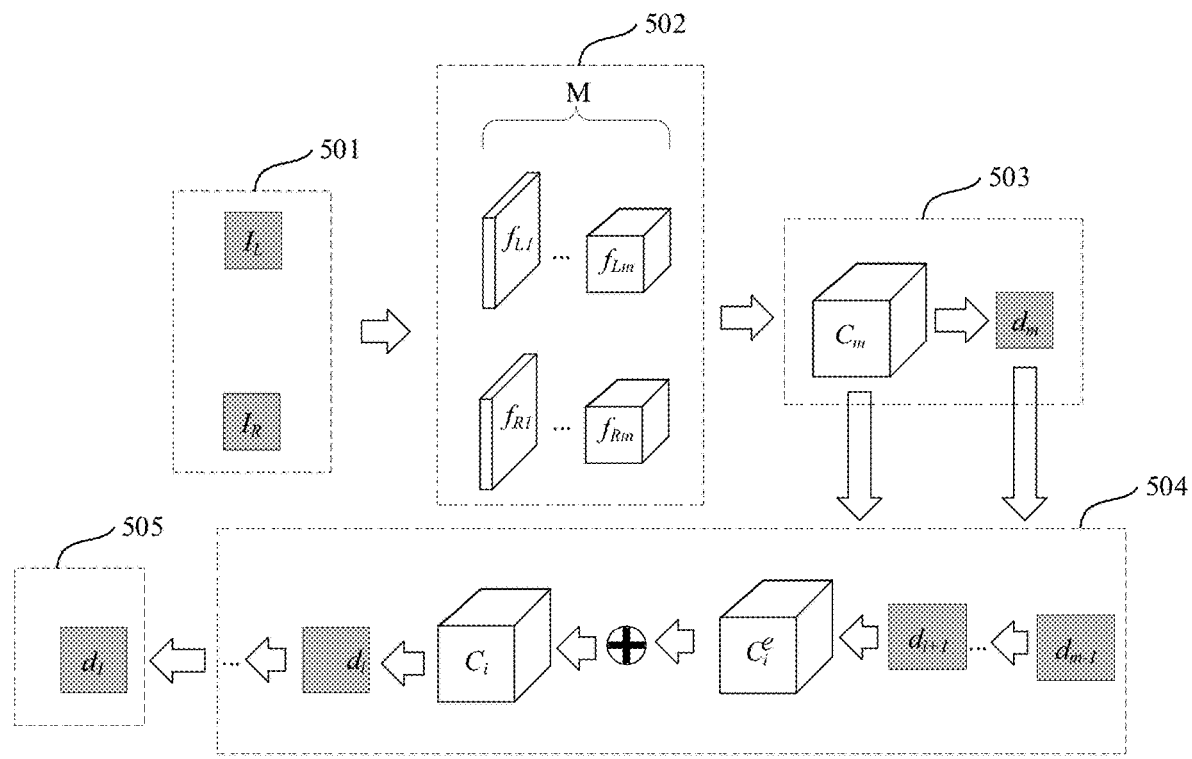
FIG. 5 is a schematic diagram of an architecture of a disparity map acquisition model according to an embodiment of the disclosure.

FIG. 5 is a schematic diagram of an architecture of a disparity map acquisition model according to an embodiment of the disclosure. The disparity map acquisition model includes an input module 501, a feature extraction module 502, an initial disparity estimation module 503, a disparity refinement module 504, and an output module 505. Since the functions implemented by the modules may be described together in the subsequent method embodiments, they are not described in detail here.

Figure 6A:
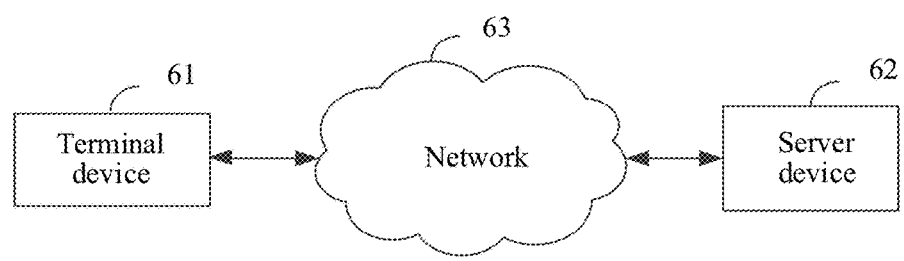
FIG. 6A is a schematic diagram of an implementation environment of a disparity map acquisition method according to an embodiment of the disclosure.

FIG. 6A is a schematic diagram of an implementation environment of a disparity map acquisition method according to an embodiment of the disclosure. A terminal device 61 is in communication connection with a server device 62 through a network 63, and the network 63 may be a wired network or a wireless network. A disparity map acquisition apparatus provided in any embodiment of the disclosure is integrated on the terminal device 61 and the server device 62 to implement the disparity map acquisition method provided in any embodiment of the disclosure. Specifically, the terminal device 61 may directly perform the disparity map acquisition method provided in any embodiment of the disclosure. Alternatively, the terminal device 61 may send a left-view image or a right-view image to the server device 62, so that the server device 62 performs the disparity map acquisition method provided in any embodiment of the disclosure and returns a result to the terminal device 61.

Figure 6B:
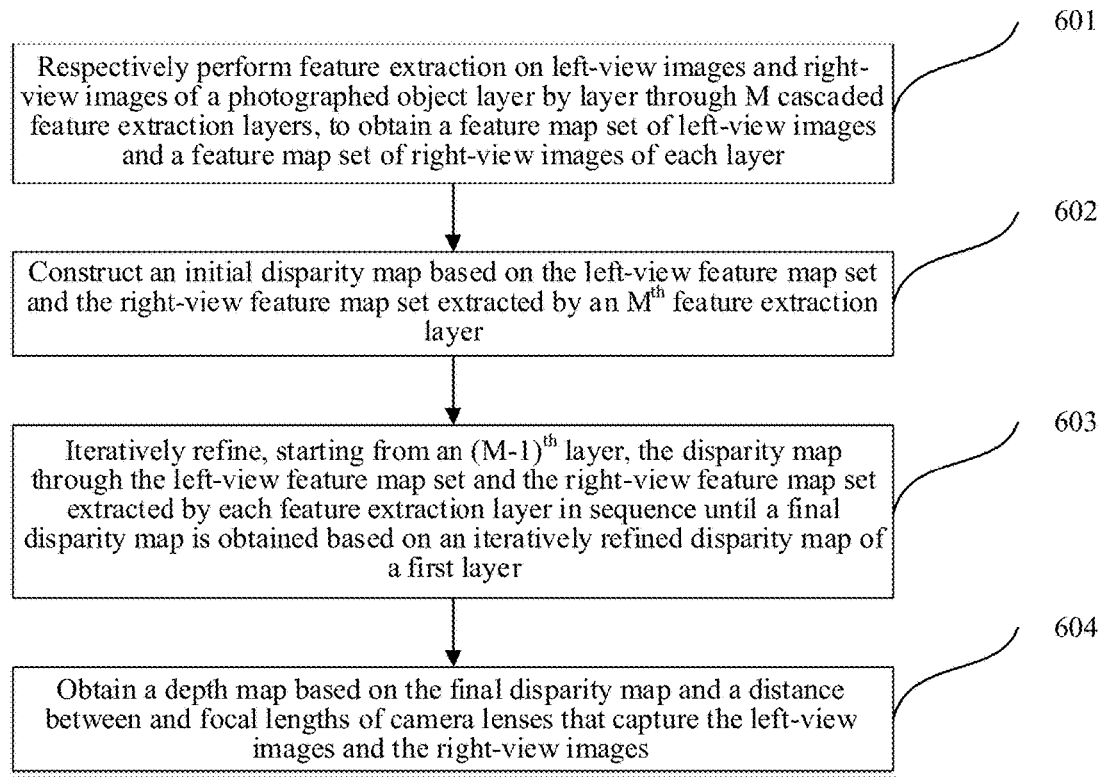
FIG. 6B is a schematic flowchart of a disparity map acquisition method according to an embodiment of the disclosure.

FIG. 6B is a schematic flowchart of a disparity map acquisition method according to an embodiment of the disclosure. The method may be, for example, performed by the disparity map acquisition apparatus provided in the embodiment of the disclosure. The apparatus may be, for example, implemented through the first vehicle 201 shown in FIG. 3 or the robot 301 shown in FIG. 4. Certainly, in a practical application process, the apparatus may also be implemented through a computer device with corresponding computing capabilities, for example, it may be implemented through a personal computer (PC), a server, or a computer cluster. The process of this method may include operations 601-604 as follows.

Operation 601: Respectively perform feature extraction on left-view images and right-view images of a captured object layer by layer through M cascaded feature extraction layers, to obtain a feature map set of left-view images and a feature map set of right-view images of each layer.

In the embodiments of the disclosure, the feature map set of the left-view images is also called a left-view feature map set, and the feature map set of the right-view images is also called a right-view feature map set.

In the embodiment of the disclosure, the left-view image $f_L$ and the right-view image $f_R$ of the captured object may be acquired through an input module. The captured object refers to an object in a capturing area. For example, when the capturing area includes only one object, the object is the only captured object, while if the capturing area includes multiple objects, these objects are all captured objects.

Specifically, the left-view image $f_L$ and the right-view image $f_R$ may be images captured by a binocular camera disposed on a device, or images captured by a monocular camera disposed on the device at different angles in the same scenario. Then, when the left-view image $f_L$ and the right-view image $f_R$ are captured by the binocular camera or the monocular camera, the captured left-view image $f_L$ and right-view image $f_R$ may be inputted to the input module for subsequent disparity prediction. Alternatively, the left-view image $f_L$ and the right-view image $f_R$ may also be images stored in a memory. Then, when disparity prediction is required, the required left-view image $f_L$ and the right-view image $f_R$ may be directly read from the memory and inputted to the input module. Certainly, the acquisition of the left-view image $f_L$ and the right-view image $f_R$ may also include other possible acquisition manners, for example, downloading from the Internet, which is not limited in the embodiment of the disclosure.

In the embodiment of the disclosure, after the left-view image $f_L$ and the right-view image $f_R$ are inputted to the input module, feature extraction is performed on the left-view image $f_L$ and the right-view image $f_R$ through a feature extraction module. The feature extraction module may use a deep CNN to extract the features of the left-view image $f_L$ and the right-view image $f_R$. The structure of the deep CNN may be, for example, a network structure such as ResNet or GoogleNet, and may certainly be any other possible network structure, which is not limited in the embodiment of the disclosure. In the following, description is made by specifically taking a deep CNN as an example.

Specifically, the feature extraction module may include M cascaded feature extraction layers. Each feature extraction layer may obtain a feature map set $f_{Li}$ of a left-view image and a feature map set $f_R$ of a right-view image through extraction. M is a positive integer greater than or equal to 2. The value of M may be determined according to the actual situation, for example, M may be 5, and certainly, it may also be any other value, which is not limited in the embodiment of the disclosure. i represents an identifier of the feature extraction layer, i∈[1, M]. Thus, $f_{Li} \in (f_{L1}, f_{L2}, \ldots f_{LM})$, and $f_{Ri} \in (f_{R1}, f_{R2}, \ldots f_{RM})$.

Figure 7:
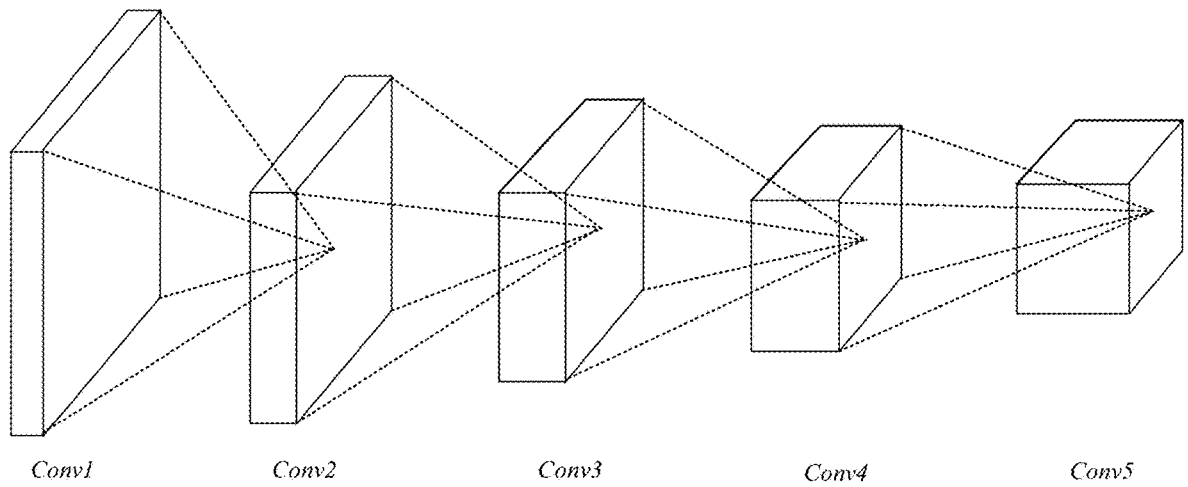
FIG. 7 is a schematic diagram of a network structure of a feature extraction module according to an embodiment of the disclosure.

FIG. 7 is a schematic diagram of a network structure of a feature extraction module. The feature extraction module shown in FIG. 7 is specifically shown with M being 5, as an example. That is, the feature extraction module in FIG. 7 includes five feature extraction layers conv1-conv5. The characteristics of each layer are shown in Table 1 below:

TABLE 1

| Number of layers | Layer parameters | Output | Resolution |
|---|---|---|---|
| conv1 | $[3 \times 3, 32] \times 3$ | $f_{L1}, f_{R1}$ | H/2 × W/2 |
| Conv2 | $\begin{bmatrix} 3 \times 3, 32 \\ 3 \times 3, 32 \end{bmatrix} \times 3$ | $f_{L2}, f_{R2}$ | H/2 × W/2 |
| Conv3 | $\begin{bmatrix} 3 \times 3, 64 \\ 3 \times 3, 64 \end{bmatrix} \times 16$ | $f_{L3}, f_{R3}$ | H/4 × W/4 |
| Conv4 | $\begin{bmatrix} 3 \times 3, 64 \\ 3 \times 3, 64 \end{bmatrix} \times 3$ | $f_{L4}, f_{R4}$ | H/8 × W/8 |
| Conv5 | $\begin{bmatrix} 3 \times 3, 64 \\ 3 \times 3, 64 \end{bmatrix} \times 3$ | $f_{L5}, f_{R5}$ | H/16 × W/16 |

As shown in Table 1, the layer parameters are the number of components in each layer, the number c of channels, and the size of the convolution kernel, and the resolution is a resolution of the extracted feature map. If the layer parameter [3×3,32]×3 of the layer conv1 indicates that the number of components of this layer is 3, and each component includes one sub-layer, the layer conv1 includes three sub-layers in total, the number c of channels is 32, that is, feature extraction is performed on 32 feature dimensions to obtain 32 feature maps and each feature map is used for representing the data of a feature extracted by the original image, and the size of the convolution kernel for convolution operation is 3×3, the resolution of the feature map extracted by the layer conv1 is H/2×W/2, H and W are the height and width of the original image, respectively. That is, the size of the feature map extracted by the layer conv1 is half of that of the original image. If the layer parameter $$\begin{bmatrix} 3 \times 3.32 \\ 3 \times 3.32 \end{bmatrix} \times 3$$

of the layer conv2 indicates that the number of components of this layer is 3, and each component includes two sub-layers, the layer conv2 includes six sub-layers in total, the number of channels is 32, and the size of the convolution kernel of each component is 3×3.

In practical applications, the layer parameters and the resolution of each layer may also be adjusted, and are not limited to the parameters shown in Table 1. In addition, to improve the effect of feature extraction, one or more feature extraction layers may also be added to the layer conv1. The layer parameters of these feature extraction layers may be the same as or different from those of the layer conv1, and the resolution may also be the same as or different from that of the layer conv1. Moreover, these layers are configured to increase the complexity of the neural network and improve the effect of feature extraction. However, the feature map sets outputted by these layers may not be used in the subsequent disparity prediction process.

In the embodiment of the disclosure, as shown in FIG. 7, the process of feature extraction is performed layer by layer, that is, the feature map set extracted by the previous layer may be used as the input of the next layer. For example, for a left-view image, the left-view feature map set extracted by the layer conv1 may be used as the input of the layer conv2. Moreover, with reference to FIG. 1, the resolution of the feature map extracted by each feature extraction layer decreases layer by layer, that is, features are gradually extracted by low level to high level.

Figure 8:
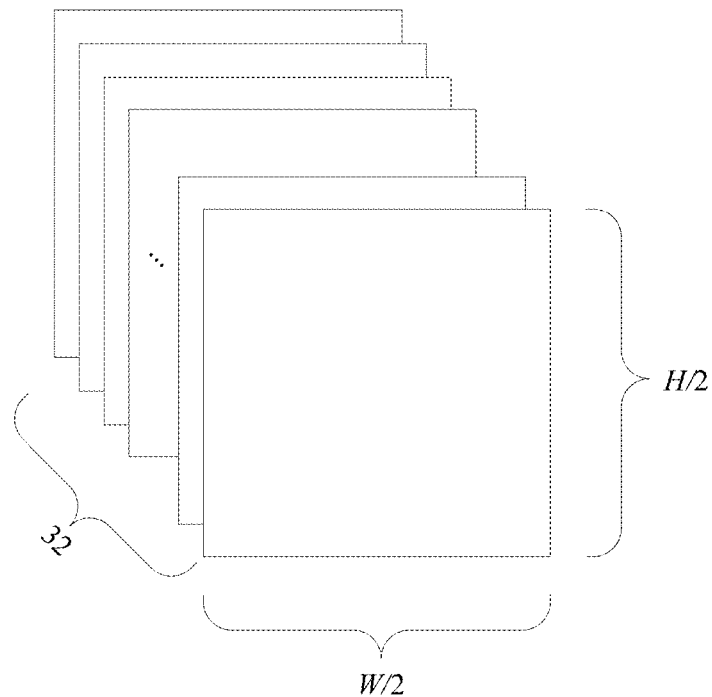
FIG. 8 is a schematic diagram of a feature map set according to an embodiment of the disclosure.

FIG. 8 is a schematic diagram of a left-view feature map set extracted by a layer conv1. The number c of channels of the left-view feature map set is 32, that is, the left-view feature map set includes 32 feature maps. Each feature map represents feature data of a left-view image in one feature dimension. Moreover, the resolution of the left-view feature map set extracted by the layer conv1 is H/2×W/2, that is, the resolution of each feature map is also H/2×W/2. For the feature maps in the left-view feature map set, the pixel points at the same position are essentially the same pixel point, and the difference is that the data of the pixel points at the same position in the feature maps represents feature data of the pixel points in a corresponding feature dimension. However, the pixel points in the feature maps are not equivalent to the pixel points in the left-view image. The right-view feature map set and the feature map sets of other layers are similar to the left-view feature map set extracted by the layer conv1, and reference may thus be made to the structure and description of the left-view feature map set extracted by the layer conv1. Therefore, the details are not described herein again.

Operation 602: Construct an initial disparity map based on the left-view feature map set and the right-view feature map set extracted by the $M^{th}$ feature extraction layer.

In the embodiment of the disclosure, after the left-view feature map set and the right-view feature map set of each layer are extracted by the feature extraction module, an initial disparity map may be constructed through an initial disparity estimation module. Specifically, since the resolution of the feature maps extracted by each feature extraction layer in the embodiment of the disclosure decreases layer by layer, the initial disparity map may be constructed through the feature map with minimum resolution. In this way, in the subsequent refinement of the disparity map, reverse adjustment may be made to finally restore the disparity map to a size that is the same as that of the original image. In other words, during construction, the initial disparity map may be constructed using the left-view feature map set and the right-view feature map set extracted by the $M^{th}$ feature extraction layer.

In practical applications, considering that the matching information from left view to right view, and the matching information from the right view to the left view cannot be exactly the same in essence, if the matching information from the left view to the right view or the matching information from the right view to the left view is quoted separately, complementary information of binocular vision cannot be fully utilized for binocular comparison. Therefore, in the embodiment of the disclosure, in construction of the initial disparity map, two initial disparity maps may be constructed simultaneously, i.e., a left-view initial disparity map and a right-view initial disparity map. Certainly, in some cases, the model may be adjusted according to the actual situation, that is, only one initial disparity map is constructed, which is not limited in the embodiments of the disclosure.

The left-view initial disparity map is constructed through matching information from the left-view feature map set to the right-view feature map set, that is, the left-view initial disparity map is obtained based on a disparity value between each pixel point in the left-view feature map set and a corresponding matched pixel point in the right-view feature map set. The right-view initial disparity map is constructed through matching information from the right-view feature map set to the left-view feature map set, that is, the right-view initial disparity map is obtained based on a disparity value between each pixel point in the right-view feature map set and a corresponding matched pixel point in the left-view feature map set. For a pixel point in the left-view feature map set, a corresponding matched pixel point thereof in the right-view feature map set refers to a pixel point in the right-view feature map set having a similarity greater than a preset similarity threshold to this pixel point, or a pixel point in the right-view feature map set having a maximum similarity to this pixel point.

In the embodiment of the disclosure, since the construction processes of the left-view initial disparity map and the right-view initial disparity map are similar, the following description is made specifically by taking the process of constructing one initial disparity map as an example. In the following description, the first feature map set is either of the left-view feature map set and the right-view feature map set extracted by the $M^{th}$ layer (or $M^{th}$ feature extraction layer), and the second feature map set is a feature map set other than the first feature map set in the left-view feature map set and the right-view feature map set extracted by the $M^{th}$ layer. For example, the first feature map set may be the left-view feature map set extracted by the $M^{th}$ layer, and the second feature map set may be the right-view feature map set extracted by the $M^{th}$ layer, and accordingly, the left-view initial disparity map is constructed. Alternatively, the first feature map set may be the right-view feature map set extracted by the $M^{th}$ layer, and the second feature map set is the left-view feature map set extracted by the $M^{th}$ layer, and accordingly, the right-view initial disparity map is constructed.

In the embodiment of the disclosure, in construction of the initial disparity map, the disparity value between each pixel point in the first feature map set and the corresponding matched pixel point in the second feature map set may be obtained, and then the disparity value corresponding to each pixel point may be mapped to the first feature map set to obtain the initial disparity map.

To determine the disparity value between each pixel point in the first feature map set and the corresponding matched pixel point in the second feature map set, the corresponding matched pixel point in the second feature map set needs to be determined first. Specifically, multiple disparity values may be set in advance, the pixel points of the left-view and right-view feature map sets are attempted to be matched according to the disparity value, and then a pixel point with a minimum matching cost is selected as the matched pixel point.

In practical applications, since two camera lenses of the binocular camera are generally disposed on the same horizontal plane, there is only a need to consider the disparity in the image in the horizontal direction. A 4D tensor may be obtained by connecting the left-view feature map set and the right-view feature map set extracted by the $M^{th}$ layer in the horizontal direction in a pixel-by-pixel misaligned manner (or pixel-by-pixel misaligned connection). That is, the second feature map set is superimposed to the first feature map set in a feature dimension according to each preset disparity value within a preset disparity range to obtain an overlapping feature map set corresponding to each preset disparity value, and the 4D tensor includes the overlapping feature map set corresponding to each preset disparity value. The horizontal direction refers to the width direction of the image.

Figure 9:
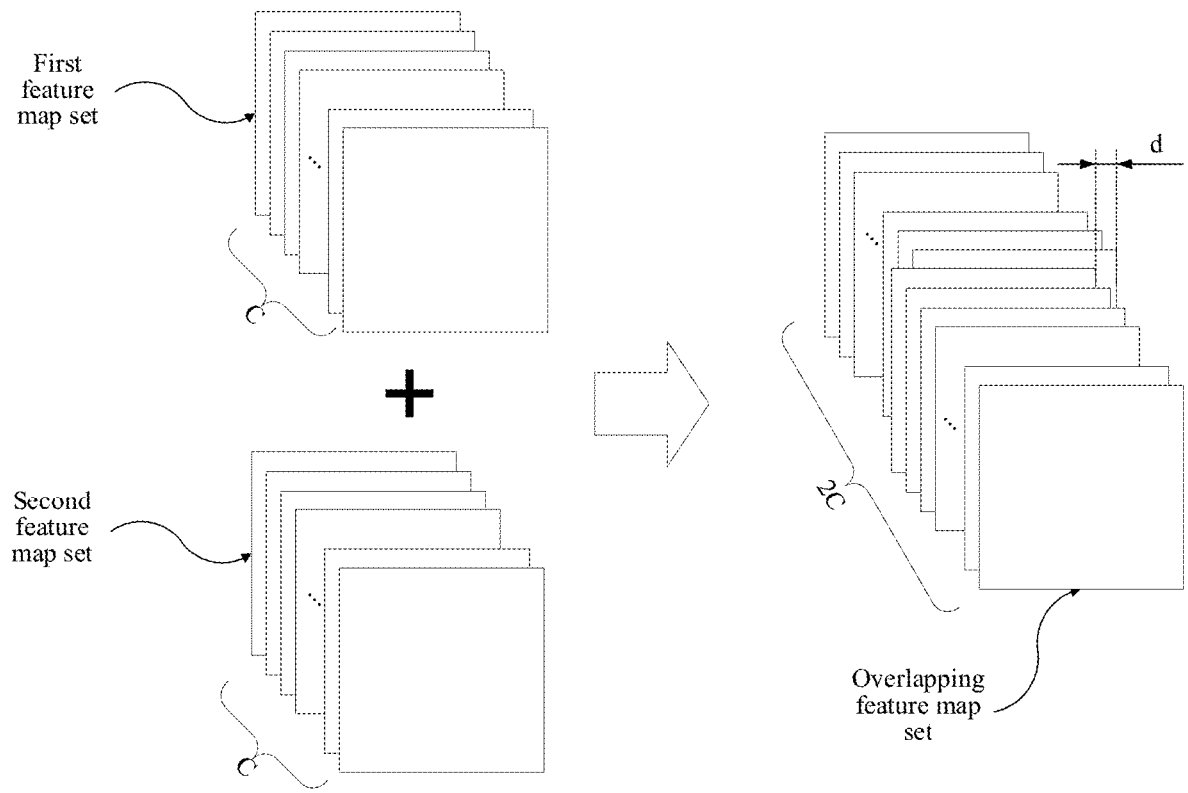
FIG. 9 is a schematic diagram of superimposition of feature map sets according to an embodiment of the disclosure.

Specifically, the pixel-by-pixel misaligned manner refers to a manner such that one of all the preset disparity values within the preset disparity range is selected in turn, and then the second feature map set is superimposed to the first feature map set in a feature dimension based on the selected preset disparity value, to obtain an overlapping feature map set corresponding to the selected preset disparity value. Accordingly, when the preset disparity range includes N preset disparity values, N superimpositions may be performed. FIG. 9 is a schematic diagram of one of the superimpositions. The preset disparity value shown in FIG. 9 is d, which is equivalent to superimposing the first feature map set and the second feature map set after misaligning by d pixel points. The feature dimension of the first feature map set and the second feature map set before superimposition is C, and the feature dimension of the overlapping feature map set after the superimposition is thus 2C.

Taking the connection of $f_{L5}$ and $f_{R5}$ as an example, the resolutions of $f_{L5}$ and $f_{R5}$ are both (H/16)×(W/16), $f_{L5}$ and $f_{R5}$ are connected in the horizontal direction in a pixel-by-pixel misaligned manner, then a 4-dimensional (4D) tensor having a dimension of $2c \times (d_{max}/16) \times (H/16) \times (W/16)$ may be obtained, where c is the number of channels of the layer conv5, H and W are respectively the height and width of the original image (the left-view image and the right-view image), and $d_{max}$ is the upper limit of the preset disparity value. $d_{max}$ may be a maximum disparity value of the original image set based on experience. For example, when $d_{max}$ is set to 160 and c is set to 64, when corresponding to the layer conv5, the upper limit of the disparity is 10, the corresponding preset disparity range is [1,10], and therefore, the dimension of the obtained 4D tensor is 128×10×(H/16)× (W/16).

In the embodiment of the disclosure, after obtaining the overlapping feature map sets corresponding to each preset disparity value, a matching cost value of the overlapping pixel point pairs in each overlapping feature map set may be obtained, and a preset disparity value corresponding to an overlapping pixel point pair having a minimum matching cost value among all overlapping pixel point pairs where each pixel point is located as the disparity value between each pixel point and the corresponding matched pixel point. One overlapping pixel point pair includes a first pixel point in the first feature map set, and a second pixel point in the first feature map set, a disparity value between the second pixel point and the first pixel point being one of the preset disparity values. The matching cost values is negatively correlated with a similarity between the first pixel point and the second pixel point. That is, the greater the matching cost value of the overlapping pixel point pair is, the lower the similarity between the two pixel points is.

Specifically, the overlapping feature map set corresponding to each preset disparity value, i.e., the 4D tensor obtained above, may be inputted into a 3-dimensional (3D) convolutional layer to calculate the matching cost values of the overlapping pixel point pairs in each overlapping feature map set. The 3D tensor $C_m$ formed by the matching cost values of the overlapping pixel point pairs in each overlapping feature map set is a tensor with a dimension of $(d_{max}/16) \times (H/16) \times (W/16)$. The 3D tensor is then inputted into a 2-dimensional (2D) convolutional layer to obtain an initial disparity map $d_m$. For each overlapping pixel point pair in the overlapping feature map set, the processing of the 3D convolutional layer is equivalent to calculating the matching cost value between two pixel points forming the overlapping pixel point pair, and the 2D convolutional layer is equivalent to selecting a minimum matching cost value from the matching cost values corresponding to the pixel points.

Through pixel-by-pixel misaligned connection, a first pixel point in the first feature map set may form an overlapping pixel point pair with the same number of preset disparity values in the preset disparity range, and two pixel points that form the overlapping pixel point pair with the minimum matching cost value are pixel points that match each other. Accordingly, the preset disparity values corresponding to the pixel points that match each other are disparity values at the positions of the first pixel points in the first feature map set and the second feature map set. For example, when the number of preset disparity values is 10, the first pixel point may form 10 overlapping pixel point pairs with 10 pixel points in the second feature map set whose disparity is within 10. Thus, after the processing of the 3D convolutional layer, the matching cost values of the 10 overlapping pixel point pairs may be determined, and then after the processing of the 2D convolutional layer, the overlapping pixel point pair with the minimum matching cost value may be determined. Moreover, the other pixel point in the overlapping pixel point pair other than the first pixel point is the corresponding matched pixel point of the first pixel point in the second feature map set.

In the embodiment of the disclosure, in the same manner as above, the disparity value corresponding to each pixel point in the first feature map set may be similarly obtained, and the disparity value corresponding to each pixel point may form the initial disparity map $d_m$.

Operation 603: Iteratively refine, starting from the $(M-1)^{th}$ layer, the disparity map through the left-view feature map set and the right-view feature map set extracted by each feature extraction layer in sequence until a final disparity map is obtained based on an iteratively refined disparity map of the first layer.

In the embodiment of the disclosure, after the initial disparity map is acquired through an initial disparity estimation module, the initial disparity map may be iteratively refined through a disparity refinement module to gradually improve the accuracy of the disparity map. Since the initial disparity map acquired by the initial disparity estimation module may include a left-view initial disparity map and a right-view initial disparity map, in practical applications, there only needs to iteratively refine the left-view initial disparity map and the right-view initial disparity map through the disparity refinement module respectively, and the iterative refinement processes are the same. The subsequent descriptions are made using an initial disparity map as an example.

Specifically, since the iterative refinement process of each layer is the same, the technical solutions in the embodiment of the disclosure will be described below with the iterative refinement process of an $i^{th}$ layer (or $i^{th}$ feature extraction layer). During the iterative refinement of the $i^{th}$ layer, an iteratively refined disparity map of the $(i+1)^{th}$ layer is inputted. Certainly, when i=M−1, since it is the first iterative refinement, the inputted disparity map is the initial disparity map. Since the $M^{th}$ layer does not need to be iteratively refined, the value of i is a positive integer greater than zero and less than M during the iterative refinement process.

In the embodiment of the disclosure, the resolution of the feature map sets obtained during feature extraction may decrease successively. Thus, during the iterative refinement, the iterative refinement may also be performed layer by layer in the reverse order of the feature extraction layers, so that the resolution of the finally obtained disparity map is the closest to the resolution of the original image, that is, the value of i is a positive integer from 1 to M−1. For example, if the number of the feature extraction layers is 5, during feature extraction, the feature extraction is performed in the order of 1→2→3→4→5, after the initial disparity map is obtained based on the feature map set of the fifth layer, the initial disparity map may be refined using the feature map set of the fourth layer, and subsequently, the disparity map outputted by the previous layer is refined sequentially in the order of 3→2→1.

In the following description, the third feature map set is either of the left-view feature map set and the right-view feature map set extracted by the $i^{th}$ layer, and the fourth feature map set is a feature map set other than the third feature map set in the left-view feature map set and the right-view feature map set extracted by the $i^{th}$ layer. For example, the third feature map set may be the left-view feature map set extracted by the $i^{th}$ layer, and the fourth feature map set is the right-view feature map set extracted by the $i^{th}$ layer. Alternatively, the third feature map set may be the right-view feature map set extracted by the $i^{th}$ layer, and the fourth feature map set is the left-view feature map set extracted by the $i^{th}$ layer.

An example process of the iterative refinement of the $i^{th}$ layer may be as follows:

As shown in Table 1, the resolution of the feature extraction layers may decrease successively, and the resolution of the disparity map after the iterative refinement of the $(i+1)^{th}$ layer is only one half of the resolution of the left-view feature map set and the right-view feature map set extracted by the $i^{th}$ layer. However, the difference in resolution necessarily renders the processing unable to be directly performed. Therefore, before each iterative refinement, the disparity map after the iterative refinement of the $(i+1)^{th}$ layer needs to be upsampled, so that the disparity map obtained by upsampling has the same resolution as the left-view feature map set and the right-view feature map set extracted by the $i^{th}$ layer. For example, based on the initial disparity map $d_5$ obtained by the layer conv5 in Table 1, $d_5$ may be upsampled first to obtain $d_5^{up}$ with a size of (H/8)× (W/8).

Certainly, if the resolution of the feature map extracted by the $i^{th}$ layer is the same as the resolution of the feature map extracted by the $(i+1)^{th}$ layer, there is no need to perform an upsampling process, and an upsampled disparity map used in the subsequent process may be replaced with the disparity map after the iterative refinement of the $(i+1)^{th}$ layer. In the following, a case where upsampling is needed is described as an example.

In an example implementation process, the upsampling of the disparity map may be accomplished by interpolation in the disparity map. The interpolation method may be, for example, a bilinear interpolation method or a bicubic interpolation method, or the like. Certainly, the interpolation method may also be any other possible interpolation method, and no limitation is made thereto in the embodiments of the disclosure.

After the upsampled disparity map is obtained, the third feature map set is mapped to the fourth feature map set according to the disparity map obtained by the upsampling, to obtain the mapped feature map set corresponding to the third feature map set.

Specifically, mapping the third feature map set to the fourth feature map set according to the disparity map refers to finding, for each pixel point in the third feature map set, a corresponding disparity value from the disparity map, and mapping the pixel point into the fourth feature map set according to the disparity value. This is equivalent to converting the third feature map set to the same coordinate system as the fourth feature map set based on the existing disparity. For example, for a first pixel point in the right-view feature map set (as an example of the third feature map set), the coordinates of the first pixel point in the right-view feature map set are (5, 5), and the corresponding disparity value thereof is 5. Thus, after being mapped into the left-view feature map set (as an example of the fourth feature map set), the coordinates of the first pixel point are (0, 5), that is, the first pixel point is shifted to the left by five pixels in the horizontal direction.

Following the above-mentioned example of $d_5^{up}$ (upsampled disparity map), the right-view feature map set $f_{R4}$ extracted by the layer conv4 may be mapped to a left-view feature map set according to $d_5^{up}$ to obtain a mapped feature map set $f_{L4}^w$. During the mapping of the feature map set, each feature map is separately mapped to the left-view feature map set according to $d_5^{up}$.

After a mapped feature map set corresponding to the third feature map set is obtained, the mapped feature map set and the iteratively refined disparity map of the $(i+1)^{th}$ layer are superimposed on a feature dimension to the fourth feature map set to obtain an overlapping feature map set. The superimposing process here is similar to the superimposing process in operation 602. Therefore, reference may be made to the description of the superimposing process in operation 602, and the details are not repeated here.

Following the above-mentioned example of $d_5^{up}$, $f_{L4}$, $f_{L4}^w$ and $d_5^{up}$ may be superimposed on the feature dimension to obtain a 3-dimensional tensor $f_4^c$ with a dimension of 129×(H/8)×(W/8). For the convenience of subsequent calculation, $f_4^c$ may be turned into a 3-dimensional tensor with a dimension of 128×(H/8)×(W/8) by dimension reduction.

In the embodiments of the disclosure, if $d_5^{up}$ is obtained by upsampling, some inevitable errors are present. Therefore, after the mapped feature map set and the fourth feature map set are superimposed, mismatches may exist in the overlapping pixel point pairs in the overlapping feature map set, and $d_5^{up}$ may thus be corrected through the overlapping feature map set.

Specifically, the overlapping feature map set may be inputted into an attention model to obtain an attention feature map set $f_i^{attn}$. The attention feature map set is used for representing the degree of difference between the mapped feature map set and the fourth feature map set. The dimension of $f_i^{attn}$ is a tensor of dimension 128×(H/8)×(W/8).

The attention model may include a simple multilayer CNN. For example, the attention model may be an attention model based on the similarity between the overlapping pixel point pairs as the weight, or an attention model based on the similarity between channels of the overlapping pixel point pairs as the weight.

In the embodiments of the disclosure, after $f_i^{attn}$ is obtained, a residual $C_i^e$ of the matching cost between the mapped feature map set and the fourth feature map set may be calculated based on $f_i^{attn}$. For example, $f_i^{attn}$ may be inputted into a 2D convolutional network to obtain the residual $C_i^e$ of the matching cost. For example, for the layer conv4 above, the dimension of the residual $C4^e$ is $[(d_{max}/8) \times (H/8) \times (W/8)]$.

The residual $C_i^e$ here is essentially a matching cost, which expresses the matching cost between the fourth feature map set and the mapped feature map set based on multiple preset disparity values within the preset disparity range. However, since the mapped feature map set here is obtained through the mapping of the upsampled disparity map, the residual $C_i^e$ here is only a part of the matching cost between the left-view image and the right-view image from the perspective of the original image. Therefore, the residual $C_i^e$ and $C_{i-1}$ may be added to obtain a refined matching cost $C_i$, and then the iteratively updated disparity map $d_i$ of the $i^{th}$ layer may be obtained according to $C_i$. Since the dimension of $C_{i-1}$ is different from that of $C_i^e$, $C_{i-1}$ may be processed through the convolutional network, so that the dimension of $C_{i-1}$ is the same as that of $C_i^e$. As shown in FIG. 5, the residuals $C_4^e$ and C5 are used to obtain the refined matching cost $C_4$, and then the iteratively refined disparity map $d_4$ is obtained according to $C_4$.

Here, the process of obtaining the iteratively refined disparity map $d_i$ of the $i^{th}$ layer according to $C_i$ is the same as the process of obtaining the initial disparity map $d_m$ based on $C_m$, so the details are not repeated here.

In the embodiments of the disclosure, the above-mentioned iterative refinement process ends until the disparity map outputted after the iterative refinement of the first layer is obtained, and the disparity map outputted after the iterative refinement of the first layer is the final disparity map.

In the embodiments of the disclosure, taking the feature extraction layers in Table 1 as an example, the resolution of d1 obtained is (H/2)×(W/2), so the result of upsampling d1 may be used as the final disparity map. Certainly, upsampling depends on the resolution of the final disparity map and the original image.

Operation 604: Obtain a depth map based on the final disparity map and a distance between and focal lengths of camera lenses that capture the left-view images and the right-view images.

In the embodiment of the disclosure, the depth map may be obtained by calculation based on the final disparity map and the distance between and focal lengths of the camera lenses that capture the left-view images and the right-view images. The depth map is used for representing distances from the captured object to the camera lenses. The application of the depth map has already been introduced in the aforementioned application scenarios, so the details are not repeated here.

Figure 10:
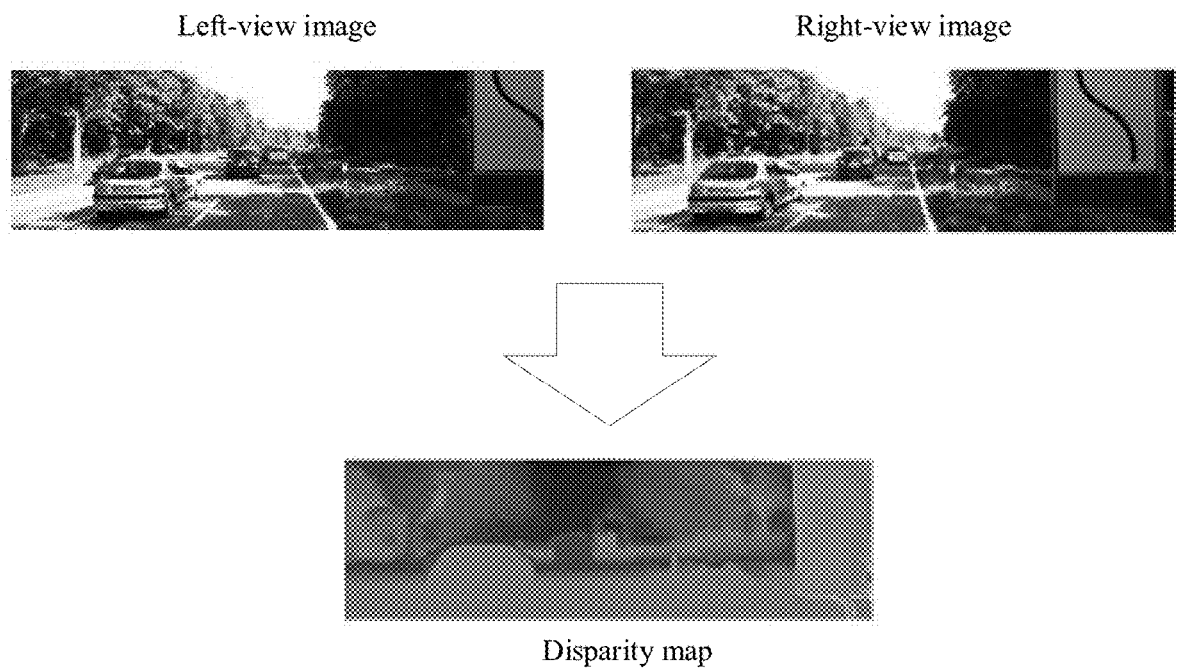
FIG. 10 is a schematic diagram of a disparity map obtained based on a left-view image and a right-view image according to an embodiment of the disclosure.

FIG. 10 is a schematic diagram of a disparity map obtained based on a left-view image and a right-view image. The disparity map here is specifically a left-view disparity map. The gray value of pixels in the disparity map may reflect the distance of an object.

In practical applications, the above-mentioned disparity map acquisition model in the embodiment of the disclosure needs to be trained in advance, that is, after an initial model is established, the initial model may be trained and learned through multiple training samples. Each training sample includes a left-view image and a right-view image, and a real disparity map of the left-view image and the right-view image. Moreover, disparity map prediction is performed on the multiple training samples through the initial model, and a cost error between the predicted disparity map and the real disparity map is calculated through a cost function. Then, model parameters are adjusted according to the cost value, and training is performed again until the cost error meets requirements.

Figure 11:
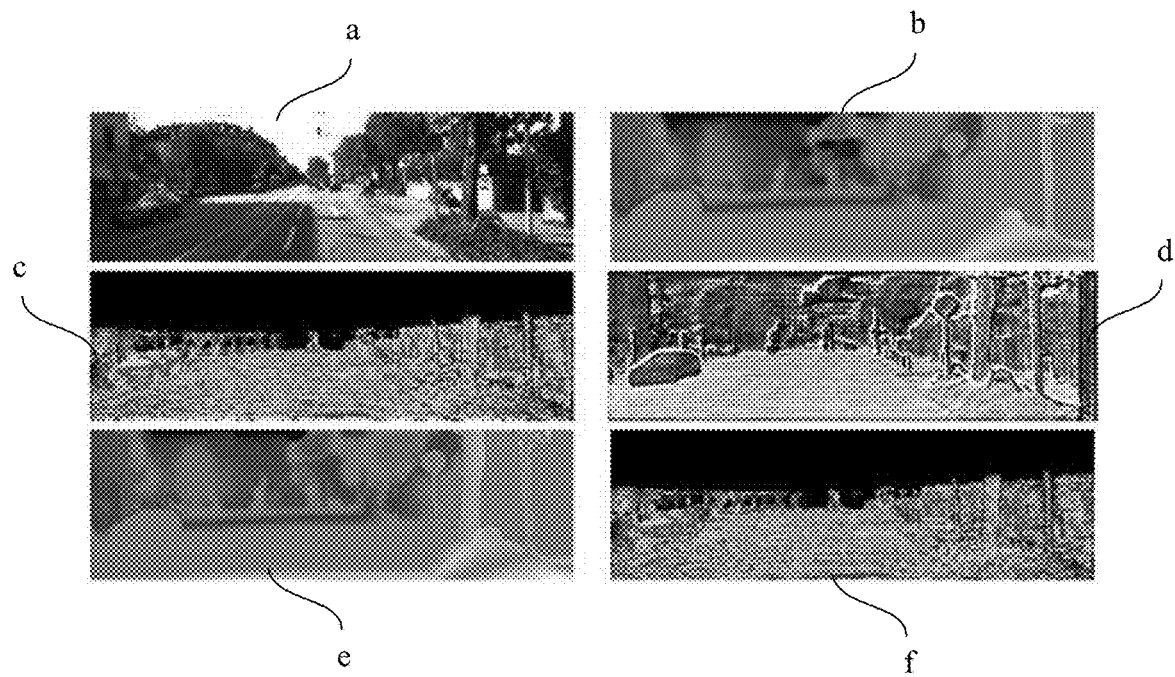
FIG. 11 is a schematic diagram of intermediate feature maps according to an embodiment of the disclosure.

FIG. 11 shows multiple intermediate feature maps obtained by a disparity map acquisition method according to an embodiment of the disclosure. In FIG. 11, image a is the inputted left-view image, image b is the obtained initial disparity map, image c shows an error between the initial disparity map and the real disparity map, image d is an attention map obtained by learning, i.e., $f_i^{attn}$, image e is an updated disparity map, and image f shows an error between the initial disparity map and the real disparity map.

In conclusion, in the embodiment of the disclosure, an initial disparity map is constructed through a left-view feature map set and a right-view feature map set extracted by an end feature extraction layer (or last feature extraction layer, e.g., M-th feature extraction layer), and then the initial disparity map is refined layer by layer through left-view feature map sets and right-view feature map sets extracted by the first (M−1)-th feature extraction layers, to correct the refined disparity map of the previous layer through the feature map set extracted by each feature extraction layer, thereby gradually reducing the error value of the disparity map and improving the finally obtained accuracy of the final disparity map. Moreover, in the embodiment of the disclosure, during the refinement of the disparity map on each layer, the disparity map outputted by the previous layer is verified through the feature map set extracted by each layer and a residual is obtained, and then a matching cost is corrected through the residual to obtain a refined disparity map. Therefore, compared with the method using a recurrent neural network, the iterative refinement in the embodiments of the disclosure does not significantly increase the calculation amount of disparity map prediction, and the time required to obtain the final disparity map is substantially the same as that without iterative refinement. Therefore, this is more time-saving or time efficient.

In addition, in the embodiment of the disclosure, the extraction granularity of M feature extraction layers increases layer by layer, and therefore, in the process of iterative refinement, because image features described by different layers are located at different scales, that is, each layer gradually changes from shallow local features to deep global semantic features, in other words, it is equivalent to reverse correction of the disparity map, the disparity map may be gradually recovered from an initial low resolution to approximate to the original image resolution, and the disparity map obtained by the prediction of the previous layer may be used to guide the estimation of the disparity map of the next layer, to achieve the purpose of continuously correcting and refining the disparity map.

Figure 12:
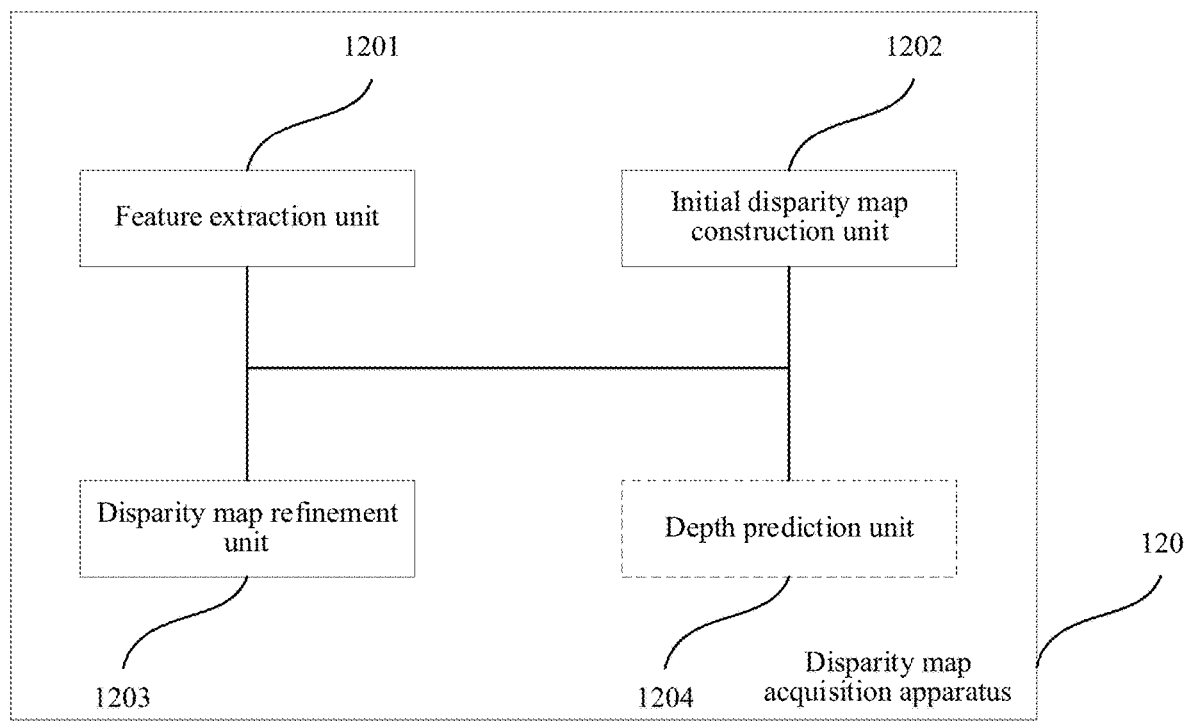
FIG. 12 is a schematic structural diagram of a disparity map acquisition apparatus according to an embodiment of the disclosure.

Referring to FIG. 12, based on the same inventive concept, the embodiments of the disclosure also provide a disparity map acquisition apparatus 120, including:

a feature extraction unit 1201, configured to respectively perform feature extraction on left-view images and right-view images of a captured object layer by layer through M cascaded feature extraction layers, to obtain a feature map set of left-view images and a feature map set of right-view images of each layer, M being a positive integer greater than or equal to 2;

an initial disparity map construction unit 1202, configured to construct an initial disparity map based on a left-view feature map set and a right-view feature map set extracted by the $M^{th}$ feature extraction layer; and a disparity map refinement unit 1203, configured to iteratively refine, starting from an $(M-1)^{th}$ feature extraction layer (in the order from the $(M-1)^{th}$ feature extraction layer to the first feature extraction layer), the disparity map through the left-view feature map set and the right-view feature map set extracted by each feature extraction layer in sequence until a final disparity map is obtained based on an iteratively refined disparity map of the first feature extraction layer, the iteratively refined disparity map of the $i^{th}$ layer being obtained by refining, by using a residual of a matching cost obtained by matching the left-view feature map set and the right-view feature map set extracted by an $i^{th}$ layer, a matching cost after iterative refinement of an $(i+1)^{th}$ layer, the disparity map used by the $(M-1)^{th}$ layer being the initial disparity map, and i being a positive integer greater than zero and less than M.

In the embodiment of the disclosure, the initial disparity map includes a left-view initial disparity map and a right-view initial disparity map, the left-view initial disparity map is obtained based on a disparity value between each pixel point in the left-view feature map set and a corresponding matched pixel point in the right-view feature map set, and the right-view initial disparity map is obtained based on a disparity value between each pixel point in the right-view feature map set and a corresponding matched pixel point in the left-view feature map set.

The disparity map refinement unit 1203 is specifically configured to:

respectively iteratively refine, starting from the $(M-1)^{th}$ layer, a left-view disparity map and a right-view disparity map through the left-view feature map set and the right-view feature map set extracted by each feature extraction layer in sequence.

In the embodiment of the disclosure, the initial disparity map construction unit 1202 is specifically configured to:

for each pixel point in a first feature map set, acquire a disparity value between the each pixel point and a corresponding matched pixel point in a second feature map set, the first feature map set being either of the left-view feature map set and the right-view feature map set extracted by the $M^{th}$ layer, and the second feature map set being a feature map set other than the first feature map set in the left-view feature map set and the right-view feature map set extracted by the $M^{th}$ layer; and map the disparity value corresponding to each pixel point to the first feature map set to obtain the initial disparity map.

In the embodiment of the disclosure, the initial disparity map construction unit 1202 is specifically configured to:

superimpose the second feature map set on a feature dimension to the first feature map set according to each preset disparity value in a preset disparity range respectively, to obtain an overlapping feature map set corresponding to each preset disparity value;

acquire matching cost values of overlapping pixel point pairs in each overlapping feature map set, one overlapping pixel point pair including a first pixel point in the first feature map set, and a second pixel point in the first feature map set, a disparity value between the second pixel point and the first pixel point being one of the preset disparity values, and the matching cost values being negatively correlated with a similarity between the first pixel point and the second pixel point; and determine a preset disparity value corresponding to an overlapping pixel point pair having a minimum matching cost value among all overlapping pixel point pairs where the each pixel point is located as the disparity value between the each pixel point and the corresponding matched pixel point.

In the embodiment of the disclosure, the disparity map refinement unit 1203 is specifically configured to:

map a third feature map set to a fourth feature map set according to the iteratively refined disparity map of the $(i+1)^{th}$ layer, to obtain a mapped feature map set corresponding to the third feature map set, the third feature map set being either of the left-view feature map set and the right-view feature map set extracted from the $i^{th}$ layer, and the fourth feature map set being a feature map set other than the third feature map set in the left-view feature map set and the right-view feature map set extracted from the $i^{th}$ layer;

superimpose the mapped feature map set and the iteratively refined disparity map of the $(i+1)^{th}$ layer on a feature dimension to the fourth feature map set to obtain an overlapping feature map set; and obtain, according to the overlapping feature map set, a residual of a matching cost for matching the left-view feature map set and the right-view feature map set extracted by the $i^{th}$ layer.

In the embodiment of the disclosure, the disparity map refinement unit 1203 is specifically configured to:

upsample the iteratively refined disparity map of the $(i+1)^{th}$ layer such that a disparity map obtained by upsampling has the same resolution as the left-view feature map set and the right-view feature map set extracted by the $i^{th}$ layer.

The mapping the third feature map set to the fourth feature map set according to the iteratively refined disparity map of the $(i+1)^{th}$ layer, to obtain the mapped feature map set corresponding to the third feature map set includes:

mapping the third feature map set to the fourth feature map set according to the disparity map obtained by the upsampling, to obtain the mapped feature map set corresponding to the third feature map set.

In the embodiment of the disclosure, the disparity map refinement unit 1203 is specifically configured to:

obtain an attention feature map set through an attention mechanism and the overlapping feature map set; and obtain, according to the attention feature map set, a residual of a matching cost for matching the left-view feature map set and the right-view feature map set extracted by the $i^{th}$ layer.

In the embodiment of the disclosure, the apparatus further includes a depth prediction unit 1204 configured to:

obtain a depth map based on the final disparity map and a distance between and focal lengths of camera lenses that capture the left-view images and the right-view images, the depth map being used for representing distances from the captured object to the camera lenses.

The apparatus may be configured to perform the method shown in the embodiments shown in FIG. 6B to FIG. 9. Therefore, for the functions and the like that may be implemented by functional modules of the apparatus, reference may be made to the descriptions of the embodiments shown in FIG. 6B to FIG. 9, and the details are not repeated herein. Although the depth prediction unit 1204 is also shown in FIG. 12, the depth prediction unit 1204 is not a required functional unit, and therefore, it is shown with a broken line in FIG. 12.

Figure 13:
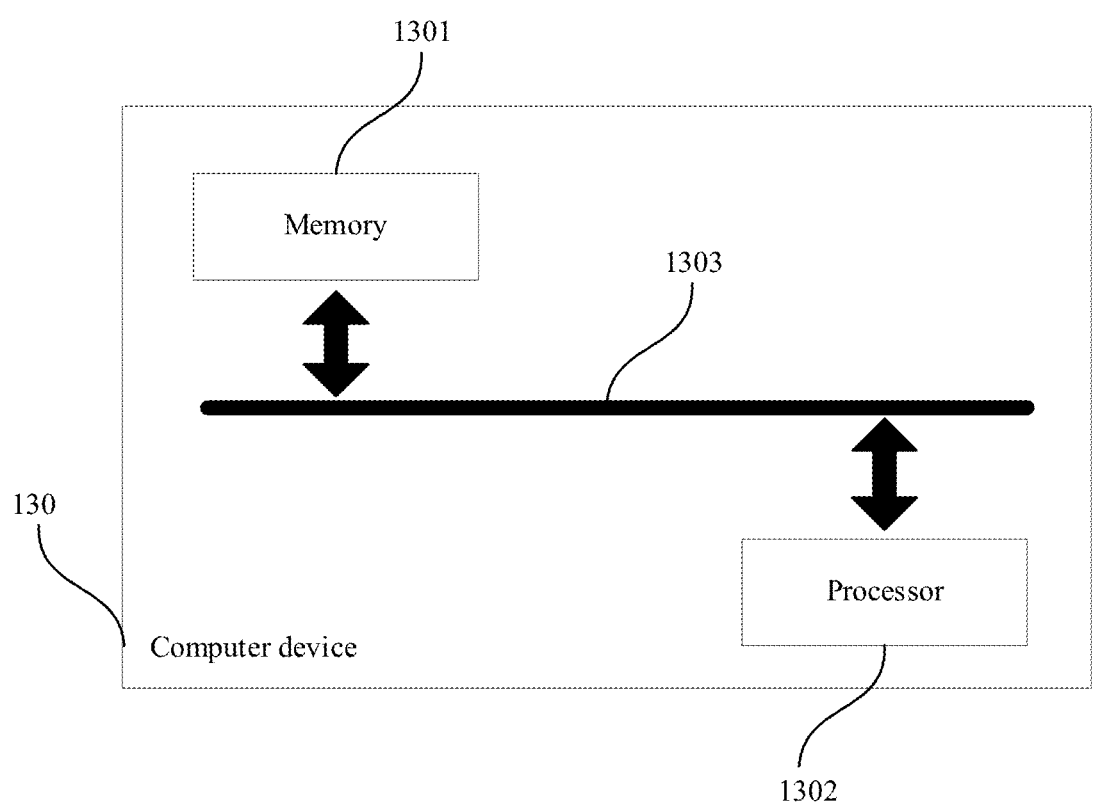
FIG. 13 is a schematic structural diagram of a computer device according to an embodiment of the disclosure.

Referring to FIG. 13, based on the same inventive concept, the embodiments of the disclosure also provide a computer device 130, which may include a memory 1301 and a processor 1302.

The memory 1301 is configured to store a computer program executed by the processor 1302. The memory 1301 may mainly include a program storage area and a data storage area. The program storage area may store an operating system, an application program that is required by at least one function, and the like. The data storage area may store data created according to use of the computer device, and the like. The processor 1302 may be a central processing unit (CPU), a digital processing unit, or the like. In this embodiment of the disclosure, a specific connection medium between the memory 1301 and the processor 1302 is not limited. In this embodiment of the disclosure, in FIG. 13, the memory 1301 and the processor 1302 are connected to each other through a bus 1303. The bus 1303 is represented by using a bold line in FIG. 13. A manner of connection between other components is only schematically described, but is not used as a limitation. The bus 1303 may be classified into an address bus, a data bus, a control bus, or the like. For ease of representation, only one bold line is used to represent the bus in FIG. 13, but this does not mean that there is only one bus or only one type of bus.

The memory 1301 may be a volatile memory, such as a random-access memory (RAM). The memory 1301 may alternatively be a non-volatile memory, such as a read-only memory, a flash memory, a hard disk drive (HDD), or a solid-state drive (SSD). Alternatively, the memory 1301 is any other medium that may be used for carrying or storing expected program code having an instruction or data structure form, and that may be accessed by a computer, but is not limited thereto. The memory 1301 may be a combination of the foregoing memories.

The processor 1302 is configured to invoke a computer program stored in the memory 1301 to perform the method performed by the devices in the embodiments shown from FIG. 6B to FIG. 9.

Figure 14:
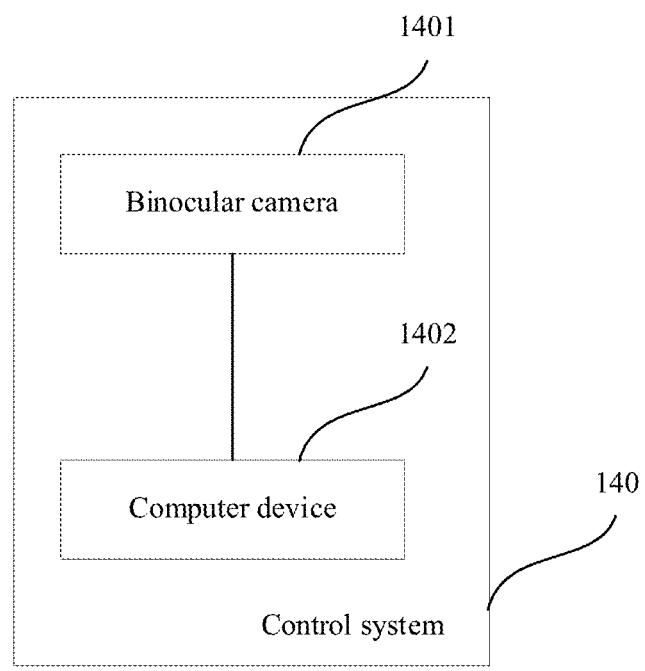
FIG. 14 is a schematic structural diagram of a control system according to an embodiment of the disclosure.

Referring to FIG. 14, based on the same inventive concept, the embodiments of the disclosure also provide a control system 140, including a binocular camera 1401 and a computer device 1402.

The binocular camera 1401 includes a left-view camera lens and a right-view camera lens. The left-view camera lens is configured to capture a left-view image, and the right-view camera lens is configured to capture a right-view image.

The computer device 1402 is configured to use the method described in the embodiments shown in FIG. 6B to FIG. 9 to acquire a disparity map between the left-view image and the right-view image, predict a distance from a captured object in the left-view image and the right-view image to the binocular camera according to the disparity map, and implement control over a controlled system according to the predicted distance.

The control system 140 may be, for example, an autonomous driving control system for controlling an autonomous vehicle, and correspondingly, the controlled system may be the autonomous vehicle. The binocular camera 1401 may be disposed on a body of the autonomous vehicle. The computer device 1402 may be disposed on the body of the autonomous vehicle. Alternatively, the computer device 1402 may be a device separated from the autonomous vehicle and in communication connection with the autonomous vehicle. In addition to the binocular camera 1401, the autonomous vehicle may further include other functional parts that may implement the functions of the vehicle, such as a body, a vehicle transmission, a vehicle brake, and wheel devices. The control system 140 may control the parts based on the disparity map obtained by the method in the embodiments of the disclosure, to implement the functions of the autonomous vehicle in cooperation.

The control system 140 may also be a robot control system for controlling a robot, and correspondingly, the controlled system may be the robot. The binocular camera 1401 may be disposed on the robot to move accordingly with the movement of the robot. The computer device 1402 may be disposed on the robot. Alternatively, the computer device 1402 may be a device separated from the robot and in communication connection with the robot. In addition to the binocular camera 1401, the robot may further include other possible parts required by the robot to work, such as a robotic arm and a moving device. The control system 140 may control the parts based on the disparity map obtained by the method in the embodiments of the disclosure, to implement an interactive function between the robot and the object in the capturing area in cooperation.

The computer device 1402 may be, for example, a computer device as shown in FIG. 13.

In some embodiments, each aspect of the method provided in the disclosure may be further implemented in a form of a program product including program code. When the program product is run on a computer device, the program code is used for enabling the computer device to perform operations of the method according to the various exemplary implementations of the disclosure described above in the specification. For example, the computer device may perform the method performed by the devices in the embodiments shown from FIG. 6B to FIG. 9.

The program product may be any combination of one or more readable mediums. The readable medium may be a readable signal medium or a readable storage medium. The readable storage medium may be, for example, but is not limited to, an electric, magnetic, optical, electromagnetic, infrared, or semi-conductive system, apparatus, or component, or any combination of the above. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

Although the exemplary embodiments of the disclosure have been described, once persons skilled in the art learn a basic creative concept, they may make other changes and modifications to these embodiments. Therefore, the following claims are intended to cover the exemplary embodiments and all changes and modifications falling within the scope of the disclosure.

A person skilled in the art would understand that various modifications and variations may be made to the disclosure without departing from the spirit and scope of the disclosure. In this case, if the modifications and variations made to the disclosure fall within the scope of the claims of the disclosure and their equivalent technologies, the disclosure is intended to include these modifications and variations.

What is claimed is:

1. A disparity map acquisition method, executed by a computer device, the method comprising:
    respectively performing, for each layer of M cascaded feature extraction layers, feature extraction on left-view images and right-view images of a captured object, to obtain a left-view feature map set and a right-view feature map set of each feature extraction layer, M being a positive integer greater than or equal to 2;
    obtaining an initial disparity map based on the left-view feature map set and the right-view feature map set extracted by an $M^{th}$ feature extraction layer; and
    iteratively refining, in an order from an $(M-1)^{th}$ feature extraction layer to a first feature extraction layer in sequence, a disparity map through the left-view feature map set and the right-view feature map set extracted by each feature extraction layer until a final disparity map is obtained based on an iteratively refined disparity map of the first feature extraction layer, an iteratively refined disparity map of an $i^{th}$ feature extraction layer being obtained by refining, by using a residual of a matching cost for matching the left-view feature map set and the right-view feature map set extracted by the $i^{th}$ feature extraction layer, a matching cost after iterative refinement of an $(i+1)^{th}$ feature extraction layer, the disparity map used by the $(M-1)^{th}$ feature extraction layer for iterative refining being the initial disparity map, and i being a positive integer greater than zero and less than M,
    wherein the obtaining the initial disparity map comprises:
    obtaining, for each pixel point in a first feature map set, a disparity value between each pixel point and a corresponding matched pixel point in a second feature map set, the first feature map set being one of the left-view feature map set and the right-view feature map set extracted by the $M^{th}$ feature extraction layer, and the second feature map set being the other one of the left-view feature map set and the right-view feature map set extracted by the $M^{th}$ feature extraction layer; and
    mapping the disparity value corresponding to each pixel point in the first feature map set to the first feature map set to obtain the initial disparity map,
    wherein the corresponding matched pixel point in the second feature map set is determined by matching pixel points of the left-view and right-view feature map sets according to each of preset disparity values in a preset disparity range and selecting a pixel point with a minimum matching cost as the corresponding matched pixel point.

2. The method according to claim 1, wherein the initial disparity map comprises a left-view initial disparity map and a right-view initial disparity map,
    the obtaining the initial disparity map comprises obtaining the left-view initial disparity map based on a disparity value between each pixel point in the left-view feature map set extracted by the $M^{th}$ feature extraction layer and a corresponding matched pixel point in the right-view feature map set extracted by the $M^{th}$ feature extraction layer, and obtaining the right-view initial disparity map based on a disparity value between each pixel point in the right-view feature map set extracted by the $M^{th}$ feature extraction layer and a corresponding matched pixel point in the left-view feature map set extracted by the $M^{th}$ feature extraction layer; and
    the iteratively refining comprises:
    respectively iteratively refining, in the order from the $(M-1)^{th}$ feature extraction layer to the first feature extraction layer in sequence, a left-view disparity map and a right-view disparity map through the left-view feature map set and the right-view feature map set extracted by each feature extraction layer.

3. The method according to claim 1, wherein the obtaining, for each pixel point in the first feature map set, the disparity value further comprises:
    respectively superimposing the second feature map set to the first feature map set in a feature dimension according to each of the preset disparity values, to obtain an overlapping feature map set corresponding to each preset disparity value;
    obtaining matching cost values of overlapping pixel point pairs in each overlapping feature map set, one overlapping pixel point pair comprising a first pixel point in the first feature map set, and a second pixel point in the first feature map set, a disparity value between the second pixel point and the first pixel point being one of the preset disparity values, and the matching cost values being negatively correlated with a similarity between the first pixel point and the second pixel point; and
    determining a preset disparity value corresponding to an overlapping pixel point pair having a minimum matching cost value among all overlapping pixel point pairs where each pixel point is located as the disparity value between each pixel point and the corresponding matched pixel point.

4. The method according to claim 1, further comprising:
    mapping a third feature map set to a fourth feature map set according to the iteratively refined disparity map of the $(i+1)^{th}$ feature extraction layer, to obtain a mapped feature map set corresponding to the third feature map set, the third feature map set being one of the left-view feature map set and the right-view feature map set extracted by the $i^{th}$ feature extraction layer, and the fourth feature map set the other one of the third feature map set in the left-view feature map set and the right-view feature map set extracted by the $i^{th}$ feature extraction layer;

superimposing the mapped feature map set and the iteratively refined disparity map of the feature extraction $(i+1)^{th}$ layer in a feature dimension to the fourth feature map set to obtain an overlapping feature map set; and obtaining, according to the overlapping feature map set, the residual of the matching cost for matching the left-view feature map set and the right-view feature map set extracted by the $i^{th}$ feature extraction layer.

5. The method according to claim 4, further comprising, prior to the mapping of the third feature map set to the fourth feature map set:

upsampling the iteratively refined disparity map of the $(i+1)^{th}$ feature extraction layer such that a disparity map obtained by upsampling has the same resolution as the left-view feature map set and the right-view feature map set extracted by the $i^{th}$ feature extraction layer; and the mapping the third feature map set to the fourth feature map set comprises:

mapping the third feature map set to the fourth feature map set according to the disparity map obtained by the upsampling, to obtain the mapped feature map set corresponding to the third feature map set.

6. The method according to claim 4, wherein the obtaining the residual of the matching cost comprises:

obtaining an attention feature map set through an attention mechanism and the overlapping feature map set; and obtaining, according to the attention feature map set, the residual of the matching cost for matching the left-view feature map set and the right-view feature map set extracted by the $i^{th}$ feature extraction layer.

7. The method according to claim 1, further comprising:

obtaining a depth map based on the final disparity map and a distance between and focal lengths of camera lenses that capture the left-view images and the right-view images, the depth map being used for representing distances from the captured object to the camera lenses.

8. A disparity map acquisition apparatus, comprising:

at least one memory configured to store program code; and at least one processor configured to read the program code and operate as instructed by the program code, the program code including:

feature extraction code configured to cause at least one of the at least one processor to respectively perform, for each layer of M cascaded feature extraction layers, feature extraction on left-view images and right-view images of a captured object, to obtain a left-view feature map set and a right-view feature map set of each feature extraction layer, M being a positive integer greater than or equal to 2;

initial disparity map obtainment code configured to cause at least one of the at least one processor to obtain an initial disparity map based on the left-view feature map set and the right-view feature map set extracted by an $M^{th}$ feature extraction layer; and disparity map refinement code configured to cause at least one of the at least one processor to, iteratively refine, in an order from the $(M-1)^{th}$ feature extraction layer to a first feature extraction layer in sequence, a disparity map through the left-view feature map set and the right-view feature map set extracted by each feature extraction layer until a final disparity map is obtained based on an iteratively refined disparity map of the first feature extraction layer, an iteratively refined disparity map of an $i^{th}$ feature extraction layer being obtained by refining, by using a residual of a matching cost for matching the left-view feature map set and the right-view feature map set extracted by the $i^{th}$ feature extraction layer, a matching cost after iterative refinement of an $(i+1)^{th}$ feature extraction layer, the disparity map used by the $(M-1)^{th}$ feature extraction layer for iterative refining being the initial disparity map, and i being a positive integer greater than zero and less than M, wherein the initial disparity map obtainment code is further configured to cause at least one of the at least one processor to, for each pixel point in a first feature map set, obtain a disparity value between each pixel point and a corresponding matched pixel point in a second feature map set, and map the disparity value corresponding to each pixel point in the first feature map set to the first feature map set to obtain the initial disparity map, the first feature map set being one of the left-view feature map set and the right-view feature map set extracted by the $M^{th}$ feature extraction layer, and the second feature map set being the other one of the left-view feature map set and the right-view feature map set extracted by the $M^{th}$ feature extraction layer, and wherein the corresponding matched pixel point in the second feature map set is determined by matching pixel points of the left-view and right-view feature map sets according to each of preset disparity values in a preset disparity range and selecting a pixel point with a minimum matching cost as the corresponding matched pixel point.

9. The apparatus according to claim 8, wherein the initial disparity map obtainment code comprises:

first superimposition code configured to cause at least one of the at least one processor to respectively superimpose the second feature map set to the first feature map set in a feature dimension according to each of the preset disparity values, to obtain an overlapping feature map set corresponding to each preset disparity value;

matching cost value obtainment code configured to cause at least one of the at least one processor to obtain matching cost values of overlapping pixel point pairs in each overlapping feature map set, one overlapping pixel point pair comprising a first pixel point in the first feature map set, and a second pixel point in the first feature map set, a disparity value between the second pixel point and the first pixel point being one of the preset disparity values, and the matching cost values being negatively correlated with a similarity between the first pixel point and the second pixel point; and disparity value determination code configured to cause at least one of the at least one processor to determine a preset disparity value corresponding to an overlapping pixel point pair having a minimum matching cost value among all overlapping pixel point pairs where each pixel point is located as the disparity value between each pixel point and the corresponding matched pixel point.

10. The apparatus according to claim 8, wherein the disparity map refinement code comprises:

mapping code configured to cause at least one of the at least one processor to map a third feature map set to a fourth feature map set according to the iteratively refined disparity map of the $(i+1)^{th}$ feature extraction layer, to obtain a mapped feature map set corresponding to the third feature map set, the third feature map set being one of the left-view feature map set and the right-view feature map set extracted by the $i^{th}$ feature extraction layer, and the fourth feature map set being the other one of the left-view feature map set and the right-view feature map set extracted by the $i^{th}$ feature extraction layer;

second superimposition code configured to cause at least one of the at least one processor to superimpose the mapped feature map set and the iteratively refined disparity map of the $(i+1)^{th}$ feature extraction layer in a feature dimension to the fourth feature map set to obtain an overlapping feature map set; and residual obtainment code configured to cause at least one of the at least one processor to obtain, according to the overlapping feature map set, the residual of the matching cost for matching the left-view feature map set and the right-view feature map set extracted by the $i^{th}$ feature extraction layer.

11. The apparatus according to claim 10, wherein the mapping code is further configured to cause at least one of the at least one processor to upsample the iteratively refined disparity map of the $(i+1)^{th}$ feature extraction layer such that a disparity map obtained by upsampling has the same resolution as the left-view feature map set and the right-view feature map set extracted by the $i^{th}$ feature extraction layer; and map the third feature map set to the fourth feature map set according to the disparity map obtained by the upsampling, to obtain the mapped feature map set corresponding to the third feature map set.

12. The apparatus according to claim 10, wherein the residual obtainment code is further configured to cause at least one of the at least one processor to obtain an attention feature map set through an attention mechanism and the overlapping feature map set; and obtain, according to the attention feature map set, the residual of the matching cost for matching the left-view feature map set and the right-view feature map set extracted by the $i^{th}$ feature extraction layer.

13. The apparatus according to claim 8, wherein the initial disparity map comprises a left-view initial disparity map and a right-view initial disparity map, the initial disparity map obtainment code is further configured to cause at least one of the at least one processor to obtain the left-view initial disparity map based on a disparity value between each pixel point in the left-view feature map set extracted by the $M^{th}$ feature extraction layer and a corresponding matched pixel point in the right-view feature map set extracted by the $M^{th}$ feature extraction layer; and obtain the right-view initial disparity map based on a disparity value between each pixel point in the right-view feature map set extracted by the $M^{th}$ feature extraction layer and a corresponding matched pixel point in the left-view feature map set extracted by the $M^{th}$ feature extraction layer; and the disparity map refinement code is further configured to cause at least one of the at least one processor to respectively iteratively refine, in the order from the $(M-1)^{th}$ feature extraction layer to the first feature extraction layer in sequence, a left-view disparity map and a right-view disparity map through the left-view feature map set and the right-view feature map set extracted by each feature extraction layer.

14. The apparatus according to claim 8, further comprising:

obtaining a depth map based on the final disparity map and a distance between and focal lengths of camera lenses that capture the left-view images and the right-view images, the depth map being used for representing distances from the captured object to the camera lenses.

15. A computer device, comprising a memory, a processor, and a computer program stored on the memory and executable by the processor, the processor being configured to execute the computer program to implement operations of the method according to claim 1.

16. A control system, comprising a binocular camera and a computer device;

the binocular camera comprising a left-view camera lens and a right-view camera lens, the left-view camera lens being configured to capture a left-view image, and the right-view camera lens being configured to capture a right-view image; and the computer device being configured to use the method according to claim 1 to predict a distance from a captured object in the left-view image and the right-view image to the binocular camera according to the disparity map, and implement control over a controlled system according to the predicted distance.

17. The control system according to claim 16, wherein the controlled system comprises at least one of an autonomous driving control system configured to control an autonomous vehicle or a robot control system configured to control a robot.

18. A non-transitory computer readable storage medium, having computer instructions stored thereon, the computer instructions, when run by at least one processor, causing at least one of the at least one processor to perform:

respectively performing, for each layer of M cascaded feature extraction layers, feature extraction on left-view images and right-view images of a captured object, to obtain a left-view feature map set and a right-view feature map set of each feature extraction layer, M being a positive integer greater than or equal to 2;

obtaining an initial disparity map based on the left-view feature map set and the right-view feature map set extracted by an $M^{th}$ feature extraction layer; and iteratively refining, in an order from an $(M-1)^{th}$ feature extraction layer to a first feature extraction layer in sequence, a disparity map through the left-view feature map set and the right-view feature map set extracted by each feature extraction layer until a final disparity map is obtained based on an iteratively refined disparity map of the first feature extraction layer, an iteratively refined disparity map of an $i^{th}$ feature extraction layer being obtained by refining, by using a residual of a matching cost for matching the left-view feature map set and the right-view feature map set extracted by the $i^{th}$ feature extraction layer, a matching cost after iterative refinement of an $(i+1)^{th}$ feature extraction layer, the disparity map used by the $(M-1)^{th}$ feature extraction layer for iterative refining being the initial disparity map, and i being a positive integer greater than zero and less than M, wherein the obtaining the initial disparity map comprises:

obtaining, for each pixel point in a first feature map set, a disparity value between each pixel point and a corresponding matched pixel point in a second feature map set, the first feature map set being one of the left-view feature map set and the right-view feature map set extracted by the $M^{th}$ feature extraction layer, and the second feature map set being the other one of the left-view feature map set and the right-view feature map set extracted by the $M^{th}$ feature extraction layer; and mapping the disparity value corresponding to each pixel point in the first feature map set to the first feature map set to obtain the initial disparity map, and wherein the corresponding matched pixel point in the second feature map set is determined by matching pixel points of the left-view and right-view feature map sets according to each of preset disparity values in a preset disparity range and selecting a pixel point with a minimum matching cost as the corresponding matched pixel point.

* * * * *